United States Patent [19]

Bargar et al.

[11] Patent Number: 5,222,170
[45] Date of Patent: Jun. 22, 1993

[54] OPTICAL FIBER DEVICE FABRICATION

[75] Inventors: Daniel S. Bargar, Hockessin; Calixto Estrada; Jodie S. Hobson, both of Wilmington, all of Del.; Keith R. Preston; Craig A. West, both of Suffolk, both of England

[73] Assignee: BT&D Technologies Ltd., Ipswich, England

[21] Appl. No.: 931,124

[22] Filed: Aug. 17, 1992

Related U.S. Application Data

[63] Continuation of Ser. No. 836,553, Feb. 18, 1992, abandoned, which is a continuation of Ser. No. 725,777, Jun. 17, 1991, abandoned, which is a continuation of Ser. No. 630,751, Dec. 21, 1990, abandoned, which is a continuation of Ser. No. 175,563, Mar. 31, 1988, abandoned.

[30] Foreign Application Priority Data

Apr. 3, 1987 [GB] United Kingdom ............... 8708034

[51] Int. Cl.$^5$ .............................................. C02B 6/42
[52] U.S. Cl. .............................. 385/88; 219/121.76; 219/121.63; 385/91; 385/92; 385/94
[58] Field of Search ............... 350/96.2, 96.21, 96.18, 350/96.15, 320; 385/88-94; 373/13, 16; 219/121.63, 121.64, 121.76, 121.85

[56] References Cited

U.S. PATENT DOCUMENTS

| H491 | 7/1988 | Pitruzzello et al. | 350/96.18 |
|---|---|---|---|
| 3,938,895 | 2/1976 | Bridger et al. | 356/152 |
| 4,119,363 | 10/1978 | Camlibel et al. | 350/96.20 |
| 4,296,998 | 10/1981 | Dufft | 350/96.20 |
| 4,306,766 | 12/1981 | Karol | 350/96.21 |
| 4,307,934 | 12/1981 | Palmer | 350/96.2 |
| 4,327,277 | 4/1982 | Daly | 219/121 LD |
| 4,400,870 | 8/1983 | Islam | 29/588 |
| 4,456,334 | 6/1984 | Henry et al. | 350/320 |
| 4,461,537 | 7/1984 | Raymer, II et al. | 350/96.2 |
| 4,615,031 | 9/1986 | Eales et al. | 350/96.2 X |
| 4,623,220 | 11/1986 | Grabbe et al. | 350/96.20 |
| 4,675,501 | 6/1987 | Klingel | 219/121 LG |
| 4,678,271 | 7/1987 | Beaulieu | 350/96.20 |
| 4,679,908 | 7/1987 | Goodwin | 350/320 |
| 4,702,556 | 10/1987 | Ishii et al. | 350/320 |
| 4,707,066 | 11/1987 | Falkenstein et al. | 350/96.20 |
| 4,707,067 | 11/1988 | Haberland et al. | 350/96.2 |
| 4,720,163 | 1/1988 | Goodwin et al. | 350/96.20 |
| 4,728,187 | 3/1988 | Dubroeucq et al. | 356/153 |
| 4,741,589 | 5/1988 | Halder et al. | 350/96.2 |
| 4,747,659 | 5/1988 | Takahashi | 350/96.21 |
| 4,752,109 | 6/1988 | Gordon et al. | 350/96.20 |
| 4,826,276 | 5/1989 | Abbott et al. | 385/94 |
| 4,859,827 | 8/1989 | Coyle, Jr. et al. | 219/121.64 |
| 4,865,410 | 9/1989 | Estrada et al. | 350/96.2 |
| 4,976,506 | 12/1990 | Paulath | 385/49 |

FOREIGN PATENT DOCUMENTS

| 21473 | 1/1981 | European Pat. Off. |
|---|---|---|
| 100086 | 2/1984 | European Pat. Off. |
| 181532 | 5/1986 | European Pat. Off. |
| 3211792 | 11/1983 | Fed. Rep. of Germany |
| 3431748 | 3/1986 | Fed. Rep. of Germany |
| 2584827 | 7/1985 | France |
| 57-193277 | 11/1982 | Japan ............... 219/121.76 |
| 2026194 | 1/1980 | United Kingdom |
| 2131971 | 6/1984 | United Kingdom |
| 2184289 | 6/1987 | United Kingdom ........ 350/96.2 |

OTHER PUBLICATIONS

Tashikawa et al., "Laser Diode Module for Analog Video Transmission," Rev. Elec. Comm. Labs, vol. 32, No. 4, pp. 598-607 (Jul. 1984).

Primary Examiner—John D. Lee
Assistant Examiner—John Ngo

[57] ABSTRACT

An optical device structure for use where an optical fiber requires to be accurately aligned in an optically coupled relationship with another optical component in a package 100 comprises an optical fiber 16 mounted in a feedthrough tube 9 which is aligned with a laser 6 through an aperture 18 in a wall 4 of the package 100. The alignment is held by a first alignment means 10, in this case a sleeve spool, which is secured to the wall 4 and to the feedthrough tube 9 relatively close to the wall 4, and by a second alignment means 11, in this case a tubular bushing, which is also fixed to the wall 4 and to the feedthrough tube 9 in a region remote from the wall 4. The use of the two alignment means 10, 11 fixed in this manner permits the desired optical coupling to be accurately fine-tuned in fabrication by a novel technique.

55 Claims, 15 Drawing Sheets

OPTICAL FIBER DEVICE FABRICATION

This is a continuation of application Ser. No. 07/836,553 filed Feb. 18, 1992, now abandoned, which is a continuation of application Ser. No. 07/725,777 filed Jun. 17, 1991, now abandoned, which is a continuation of application Ser. No. 07/630,751 filed Dec. 21, 1990 (abandoned) which is a continuation of Ser. No. 07/175,563 filed Mar. 31, 1988 (now abandoned).

BACKGROUND OF THE INVENTION

Field of the Invention

The present invention relates to optical devices, or device packages, which comprise an optical fiber together with at least one other optical component, and to methods of fabrication of such devices. In particular, the invention relates to devices in which an optical fiber is aligned and fixed relative to another component, and to methods of achieving this alignment and fixation.

The importance of accurate alignment of an optical fiber with other components in optical devices is well known. In an optoelectronic device such as a transmitter or receiver, for example, alignment of an optical fiber with a laser or receiver chip is necessary to attain optimum coupling of light energy. This is especially true for transmitters, where good optical coupling permits a laser to be operated using minimum current, thus reducing the heat generated during lasing and extending the life of the laser. Thermal expansion problems inherent in transferring heat from the laser are also minimized and, for some applications packaging costs can be reduced through elimination of the need for a thermoelectric cooler.

In fabrication, not only must the fiber be aligned in three coordinates for optimum coupling with the laser, but this alignment must also be fixed by a rigid securement and must not be altered by shrinkage forces during fixation or subsequent processing. For a single mode fiber, for example, final alignment must generally be held to within plus or minus one-half micrometer in dimensions radial to the fiber and to within one or two micrometers axially.

Welded joints, which offer rigidity and long term durability, are generally preferred for fixing the alignment. However, shrinkage of the welds on cooling is a factor that has to be considered when dealing with dimensional stability in the micrometer range. Furthermore, since the constituent parts are extremely small (a typical laser transmitter package measures on the order of 6 mm×7 mm×3 mm), it is important to accomplish the welds without disturbing any of the optoelectronic package bonds accomplished prior to fiber alignment. In the fabrication of a laser transmitter package the alignment and fixation operation conveniently takes place with the laser operating and emitting light. Under these conditions, to avoid adverse effects on the laser, it is critical that the laser's temperature should not be raised by the welding activity.

Conventionally, packages which incorporate sensitive components such as lasers, for example, are hermetically sealed to provide the component with a closed and protected environment. It is customary to introduce a communicating optical fiber into such packages via a suitable feedthrough connection. In fabrication, the fiber is first inserted into the feedthrough and the feedthrough is secured to the package. The portion of fiber internal to the package is then aligned with the laser, or other component and separately fixed in position. U.S. Pat. No. 1,615,031 for example, discloses one such fabrication technique in which an anchorage clamp welded over the fiber inside the package is used to fix the alignment.

It is one object of the present invention to provide a novel optical fiber assembly with a structure which facilitates optical fiber alignment and fixation and which avoids or mitigates the problems mentioned above.

It is another object of the invention to provide an improved method of fabrication of devices which need an optical fiber alignment.

SUMMARY OF THE INVENTION

Accordingly the present invention provides an optical fiber assembly which comprises an optical fiber having an end portion secured in a feedthrough member; an optical component mounting having an optical component mounted thereon and having a wall member provided with an aperture therein, the end portion of the optical fiber extending through the aperture and being aligned in optically coupled relationship with the component; and first alignment means for securing a primary alignment of the end of the fiber with the component and second alignment means for securing a subsequent secondary alignment; wherein the alignment means are both secured to the wall member and to the feedthrough member, the first alignment means being secured to the feedthrough member proximate to the component, and the second alignment means being secured thereafter to the feedthrough member at a relatively greater distance from the component.

Preferably, the first and second alignment means comprise first and second bushing members extending circumferentially around the feedthrough member.

Conveniently, the bushing members are both secured to the side of the wall member facing away from the component.

This device structure has the advantage, inter alia, that the fiber feedthrough can be fixed into the component mounting and the alignment can be made to achieve the optically coupled relationship at the same time.

The structure is also well adapted to mitigate the problems of distortion introduced by shrinkage of laser welds when used to secure the alignment means, for example. The provision of two successively installed alignment means, preferably bushing members, enables an initial, possibly coarser, alignment to be secured, which may subsequently be fine-tuned by slightly deforming the first securement, if necessary. The second alignment means is secured to the feedthrough member at a greater distance from the component than the first. Any small distortions which may occur when fixing the second alignment means are therefore effectively scaled down such that the optically coupled relationship is not then significantly disturbed.

The structure has an important application where the component in the optical fiber assembly is a semiconductor laser.

In a preferred embodiment, the first alignment means comprises a sleeve spool having a flange at one end and a barrel portion extending out from the flange. The flange is secured to the wall member and the barrel portion is secured to the feedthrough member. The barrel portion is preferably thin-walled and is secured to the feedthrough member by welds made through the wall rather than at the rim of the barrel portion.

In these circumstances, the inventors have found that any shrinkage of such welds is substantially radial. Thus, if the welds are simultaneously made and radially balanced, the potential for distortion of the first alignment in x- and y- axes can be significantly reduced. The need for readjustment of the alignment before fixing the second alignment second alignment means is consequently likewise reduced.

The structure facilitates a novel method of achieving and fixing the required optically coupled relationship, which method is advantageously adapted to automation.

Accordingly, in another aspect, the present invention provides a method of aligning and fixing in optically coupled relationship an optical fiber having an end portion secured in a feedthrough member and an optical component mounted on a component mounting having a wall member provided with an aperture therein, the method comprising the steps of:

(a) positioning the optical fiber end portion in the feedthrough member in the aperture and aligning the fiber in optically coupled relationship with the component;

(b) securing first alignment means to the wall member;

(c) securing the first alignment means to the feedthrough member at a first fixing region thereof proximate to the component;

(d) checking the optically coupled relationship and realigning the fiber, if necessary, by applying appropriate leverage forces to the feedthrough member further from the component than the first fixing region thereby distorting the securement of the first alignment means in order to restore said relationship;

(e) securing second alignment means to the wall member; and (f) securing the second alignment means to the feedthrough member at a second, distal fixing region thereof remote from the component and the first fixing region.

Conveniently, the securing steps comprise laser welding.

Preferably the laser welding is radially balanced around the feedthrough member in order to reduce the disturbance of the optically coupled relationship which may be induced by weld shrinkage.

The optically coupled relationship may be checked and the alignment readjusted before each securing step.

By applying leverage as described in step (d), the force applied to previously made joints is effectively controlled, allowing the joints to be more easily elastically and plastically distorted to restore optimum optical coupling. Additionally, large movements at the points of leverage produce proportionately smaller movements at the end of the fiber. This gearing-down effect advantageously improves the accuracy of the realignment procedure.

BRIEF DESCRIPTION OF THE DRAWINGS

Embodiments and aspects of the present invention will now be described by way of example and in more detail with reference to the accompanying drawings, in which.

DETAILED DESCRIPTION OF THE INVENTION

Figure 1:
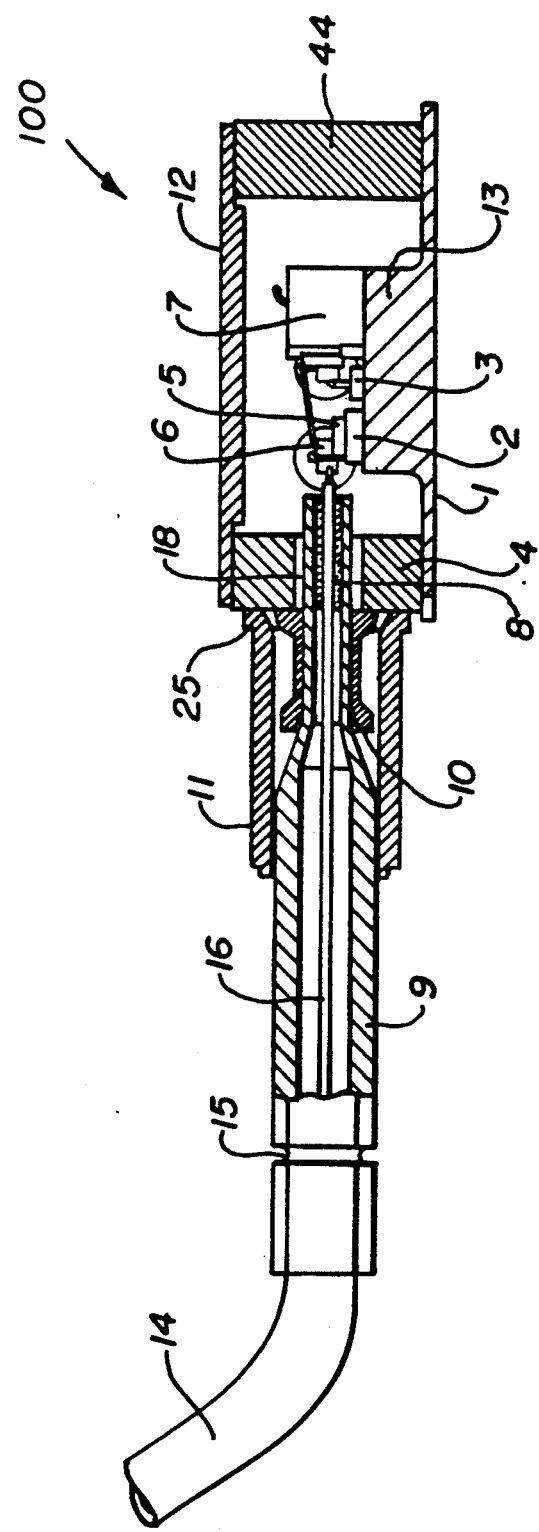
FIG. 1 is an enlarged elevational partial cross-section of an optoelectronic device, a transmitter, according to the invention, the section taken on line A—A of FIG. 2.

Throughout the following detailed description similar reference numerals refer to similar elements in all Figures of the drawings.

Figure 2:
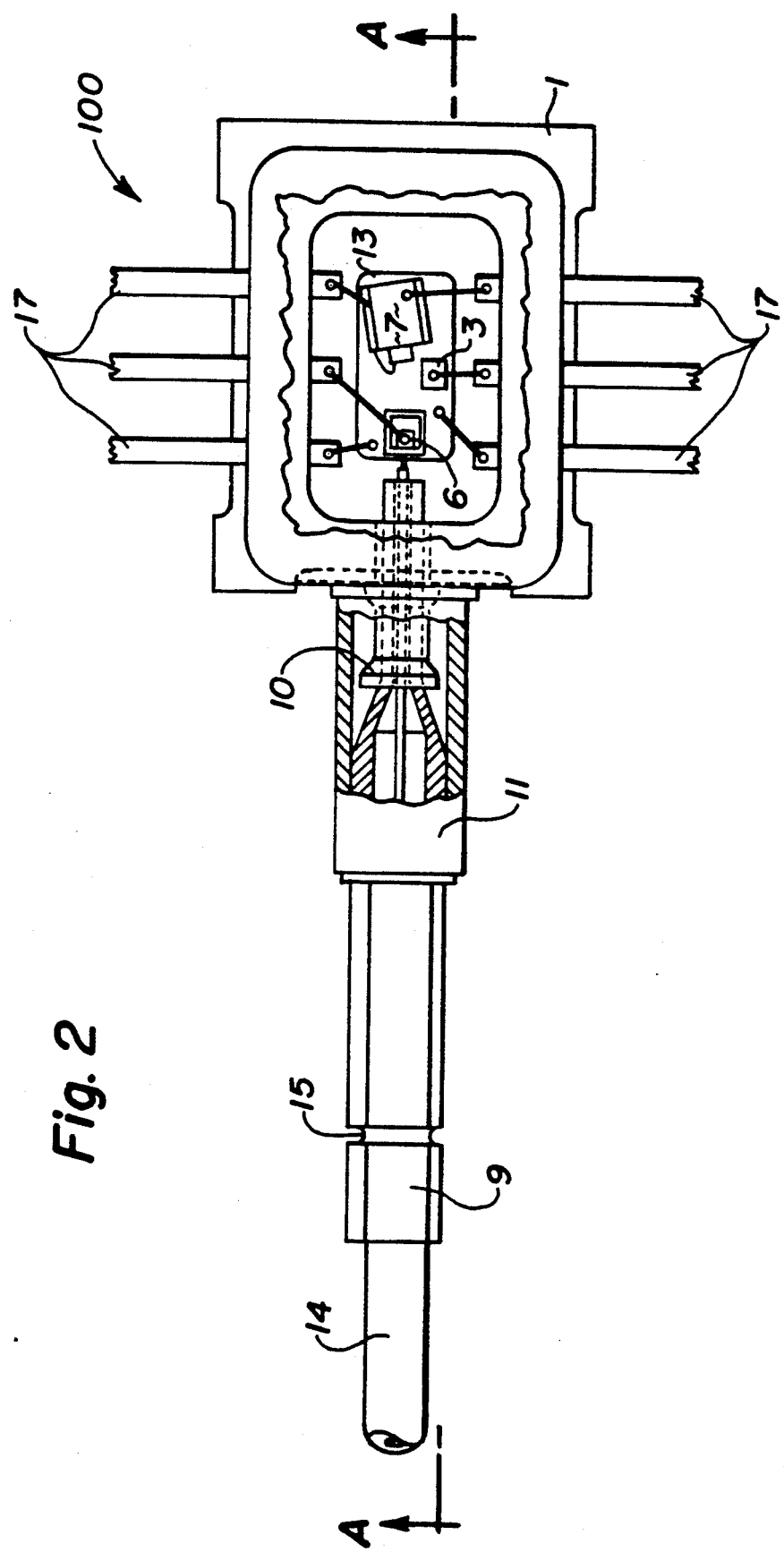
FIG. 2 is a plan view of the same device, the lid being shown broken to display internal components.

Refer now to FIGS. 1 and 2. FIG. 1 is an enlarged elevational partial cross-section of an optoelectronic package 100 shown here for convenience configured as a transmitter and FIG. 2 shows the same structure in an enlarged plan view. The base 1 of the package 100 has an internal pedestal 13 which may be an integral part of the base 1. A gold pad 2 is thermocompression bonded to the upper surface of the pedestal 13. The laser 6 is mounted on a diamond heat sink 5 which in turn is fixed to the gold pad 2. Also mounted on the pedestal 13 are a temperature sensor 3 and a photodetector 7. The package is enclosed by a walled frame of which the front wall 4 and the rear wall 44 are shown in FIG. 1. Electrical connections are made via the terminals 17 mounted in the side walls of the frame. The upper side of the package is sealed by a lid 12.

An optical fiber pigtail 14 with an end portion mounted in a feedthrough tube 9 and secured by a crimp 15 is fixed in the package in optically coupled relationship with the laser 6. The structure of one suitable type of feedthrough tube is described in more detail in U.S. application Ser. No. 07/074,791, filed Jul. 17, 1987, based on the priority of copending British priority Patent application 8629158 dated Dec. 5, 1986 in the name of the present applicants.

Within the feedthrough tube 9, the optical fiber pigtail has the inner and outer buffer layers removed to expose the optical fiber 16 itself. The fiber 16 is provided with a lens termination in a conventional manner. The feedthrough tube 9 is necked down at its inner end to fit within a sleeve spool 10. The sleeve spool 10 acts as the first alignment means in this embodiment. The outer major diameter of the feedthrough tube 9 is mounted within a tubular flanged bushing 11, which provides the second alignment means in this case. The optical fiber 16 is supported within the necked down portion of the feedthrough tube 9 by a glass seal 8 and the end of the feedthrough tube 9 passes through an oversize hole 18 in the front wall 4 so that the lens on the end of the optical fiber 16 is initially located approximately 0.008 to 0.010 inches from the active facet of the laser 6.

The tubular flanged bushing 11 is hermetically sealed to the wall 4 at one end and to the feedthrough tube 9 at the other. The flange 25 on the bushing 11 provides material for a seam weld. The sleeve spool 10 is fastened (or may be sealed) to the wall 4 and fastened (or may be sealed) to the feedthrough tube 9 at the waist of the spool. The glass seal 8 hermetically seals the optical fiber 16 within the feedthrough tube 9. The outer end of the pigtail 14, which is engaged within the feedthrough tube 9 by the crimp 15, may be further sealed with heat-shrink tubing or epoxy or like sealant (neither of which are shown).

Figure 3:
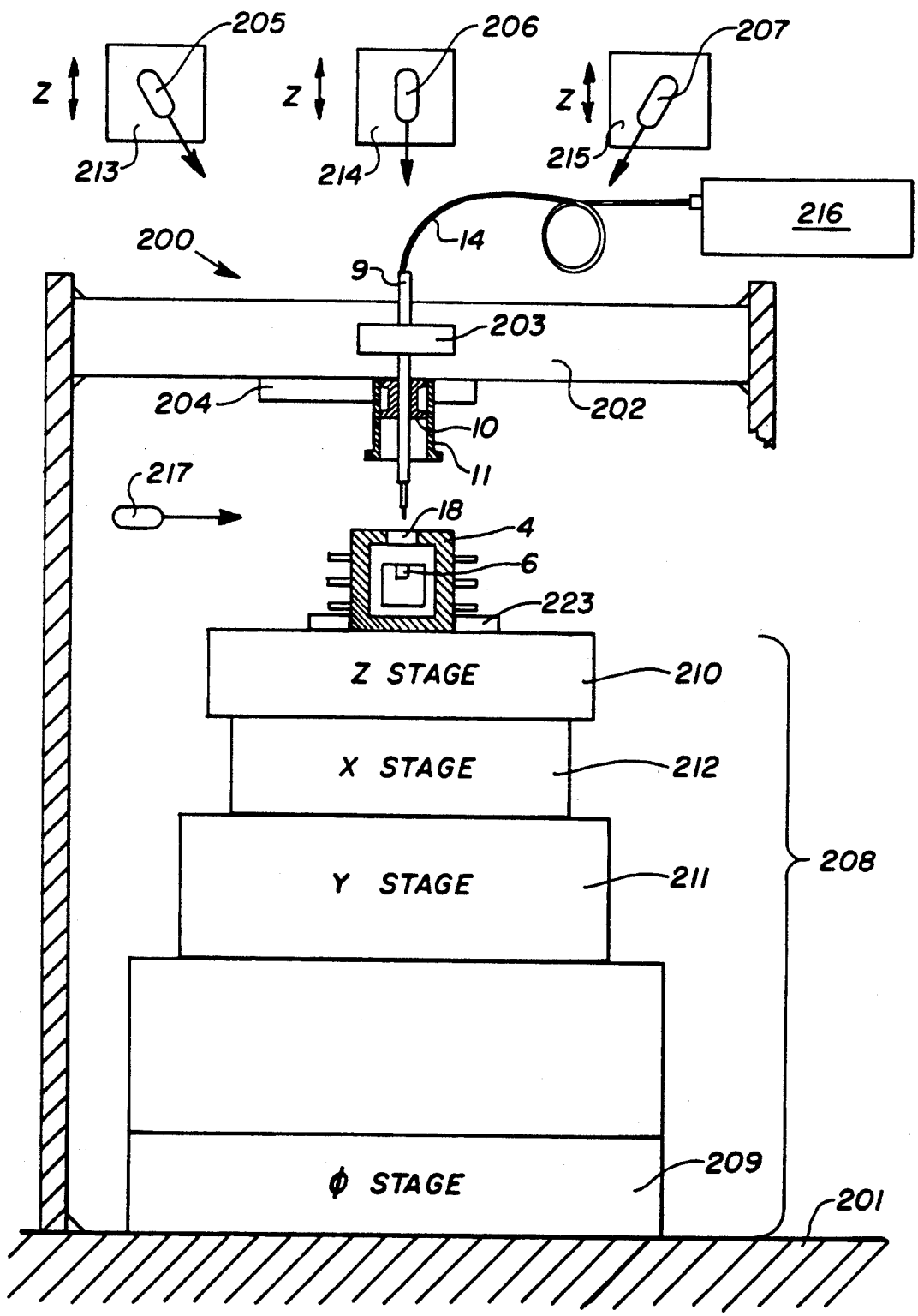
FIG. 3 is a schematic elevational view of an apparatus for carrying out the method of the invention.

FIG. 3 illustrates schematically the configuration of an apparatus 200 for assembling the transmitter package 100 and in particular for aligning, fixing and sealing the fiber in the feedthrough tube 9 in the package. In assembly the optical fiber in the feedthrough tube 9 is aligned at substantially the optical optimum relative to the electronically active device here the laser 6 and fixed in that attitude. Additionally, the feedthrough tube 9 may conveniently be hermetically sealed to the wall 4.

The apparatus 200 features a base 201, which is aseismically mounted to isolate the mechanisms from ambient vibrations. A beam 202 is supported above the base and carries an optical fiber feedthrough clamp 203, which is shown holding a feedthrough tube 9 previously assembled to a fiber pigtail 14. The feedthrough tube 9 is clamped at its upper end near the crimp 15.

Figure 4:
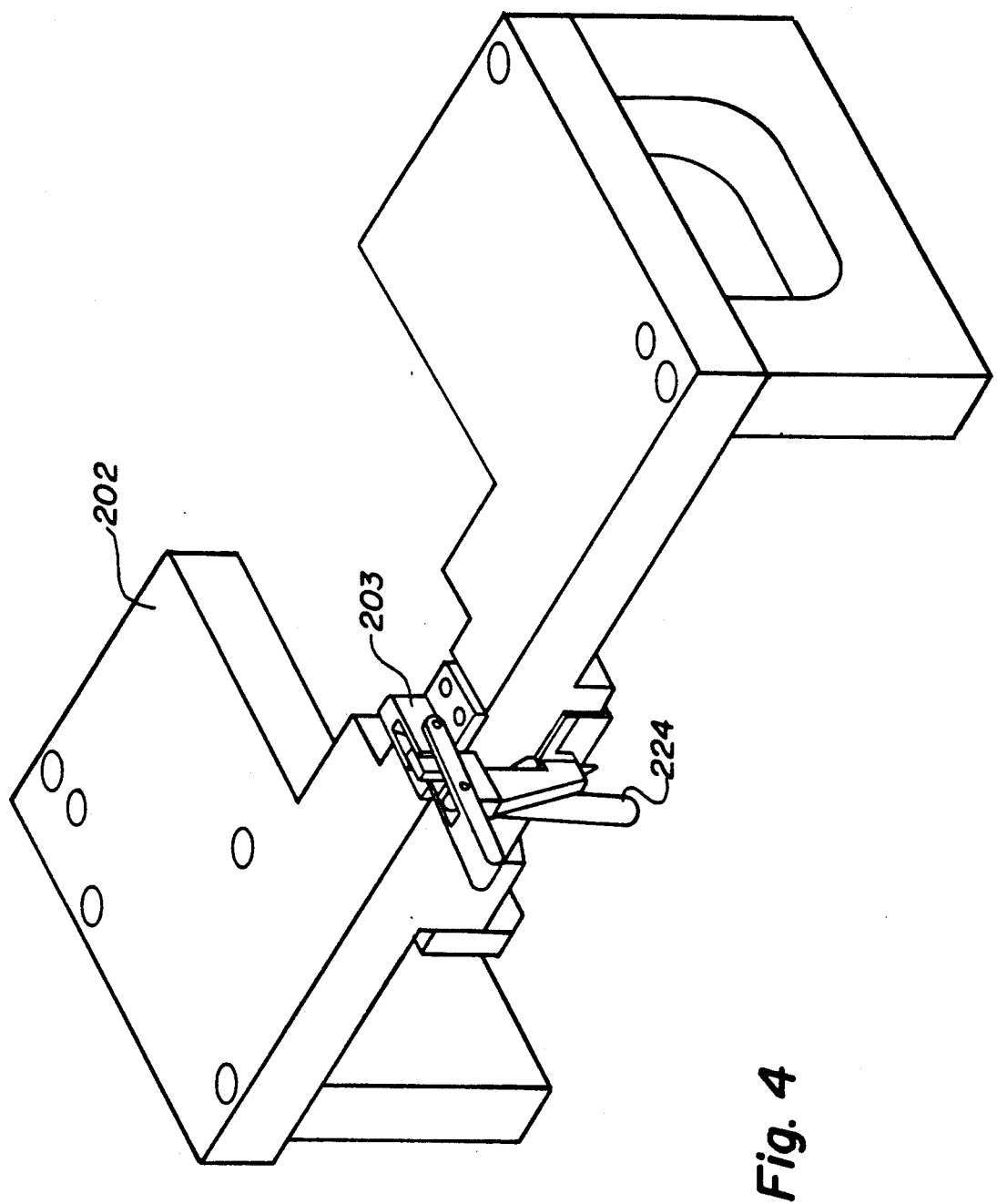
FIG. 4 is a perspective view of a beam and clamp employed in the apparatus of FIG. 3.

The beam 202 and clamp 203 are illustrated in more detail in FIG. 4. The clamp 203 shown is an over-the-center clamp operated by a lever mechanism 224. Operation of the clamp may be automated in a conventional manner for example, using an air controlled actuator (not shown). Returning to FIG. 3, a partially assembled package (base 1, frame with wall 4 and optoelectric components, of which only the laser 6 is shown for clarity) is clamped in an aligning and connecting fixture 223, which provides electrical connections to the laser 6 and holds the frame aligned vertically. The fixture 223 is itself mounted on a manipulating assembly 208 having four degrees of freedom. These are provided by four stages 209, 210, 211, 212 of a micromanipulator that is controllable in horizontal X and Y directions, vertical Z direction and for $\phi$ rotation about the Z axis. The feedthrough tube 9 is held stationary in the clamp 203 while the partially assembled package 100 is manipulated on the stages to achieve proper alignment.

Figure 5:
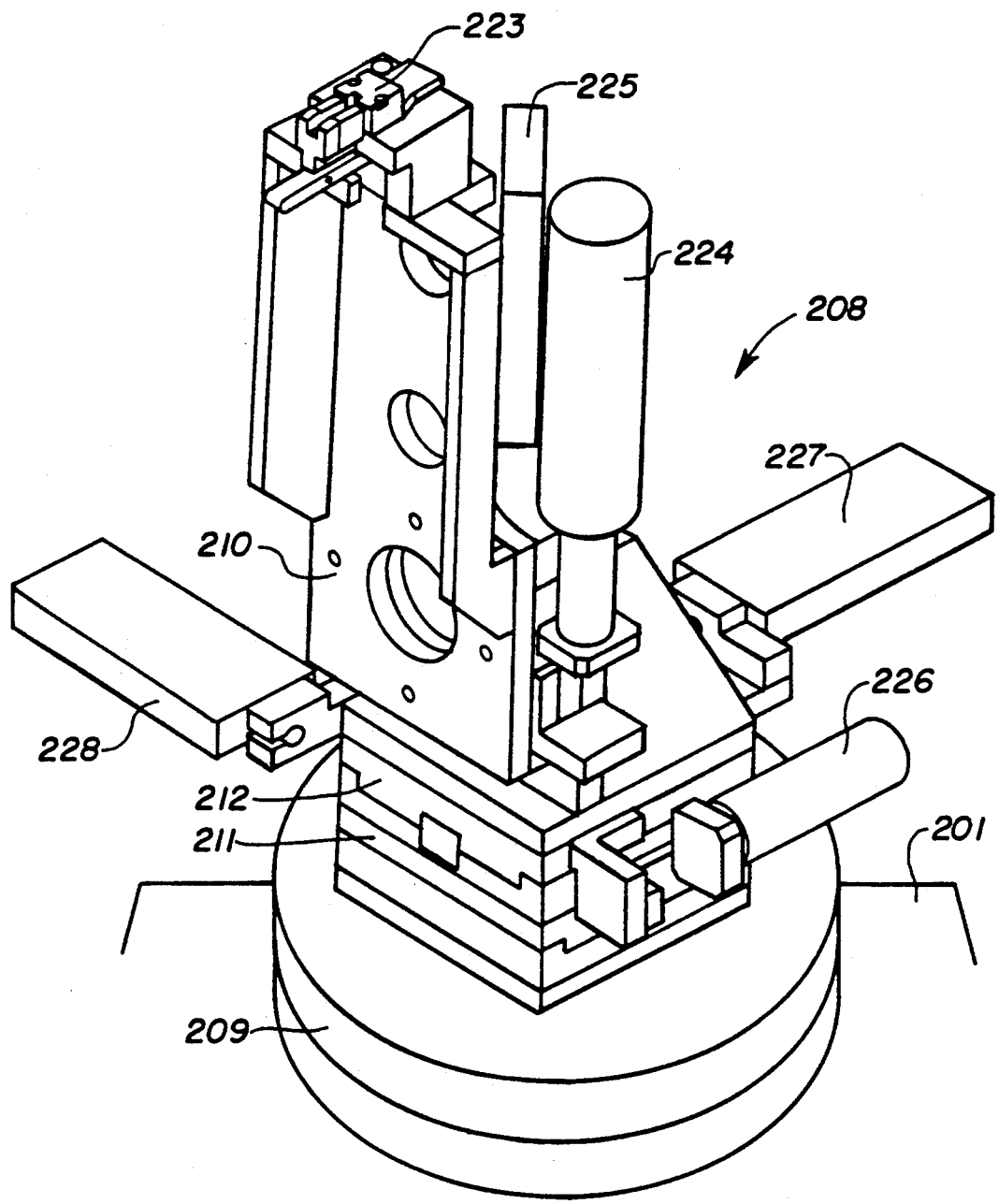
FIG. 5 is a perspective view of the micromanipulating stages employed in the apparatus of FIG. 3 for moving the fixture holding the device being assembled by the method of the invention.

The manipulating assembly 208 may be seen in greater detail in FIG. 5. The base 201 is a rigid slab of granite mounted on seismic isolators. The $\phi$ rotation stage 209 is fastened to the base and supports the Y translation stage 211. The Y stage 211 is driven by a motor 226 and its position is monitored by an optical encoder or digital length gauge 227. Similar devices drive and monitor the position of the o rotation stage 209, but are not visible from the perspective of FIG. 5.

The X translation stage 212 is supported on the Y stage 211 and is also driven by a motor (not visible from the perspective of the Figure) whilst its position is monitored by an optical encoder 228. The Z translation stage 210 is mounted on the X translation stage and is driven by another motor 224, whilst its position is monitored by a further optical encoder 225. The fixture 223, which holds the package 100, is mounted on the Z translation stage 210 and may be manually or automatically operated as appropriate.

Returning again to FIG. 3, three laser welding optical collimators 205, 206, 207 are disposed at 120 degree spacings about the Z axis of rotation of the manipulating assembly 208, and the vertical axis of the fiber in the feedthrough tube 9 is aligned with this same axis. The collimators 205, 206, and 207 are mounted on micromanipulator stages 213, 211, and 215 which are controllable for motion in the vertical Z direction.

Figure 6:
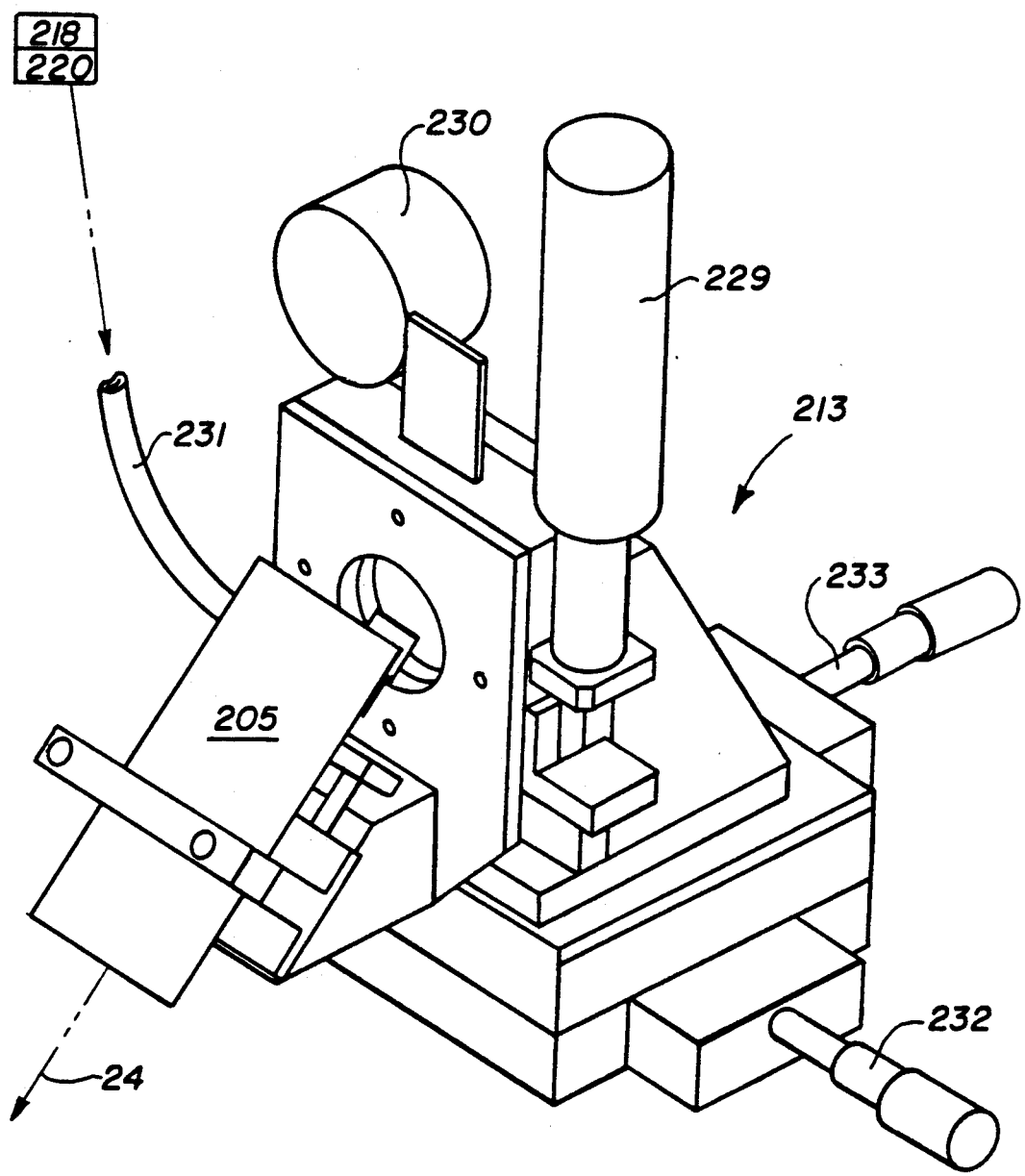
FIG. 6 is a perspective view of the type of traverser on which are mounted the laser optics used in laser welding in the securing steps of the method.

FIG. 6 provides a more detailed view of one laser welding optical collimator 205 and its associated micromanipulator stage 213. The other collimators are substantially identical. The collimator 205 is driven in the Z axis by a motor 229 which is counterbalanced by a spring assembly 230. In operation coherent light from a laser welding source 218 travels via a beamsplitter 220 which divides the light between the three collimators, to the collimator 205 along an optical fiber 231. The collimator directs the coherent beam for welding in the direction indicated by the broken arrow 24. A micrometer 232 provides tangential adjustment and a micrometer 233 provides radial adjustment for calibration purposes. The stage 213 is itself mounted to the seismically isolated base 201 at a suitable elevation.

Figure 7:
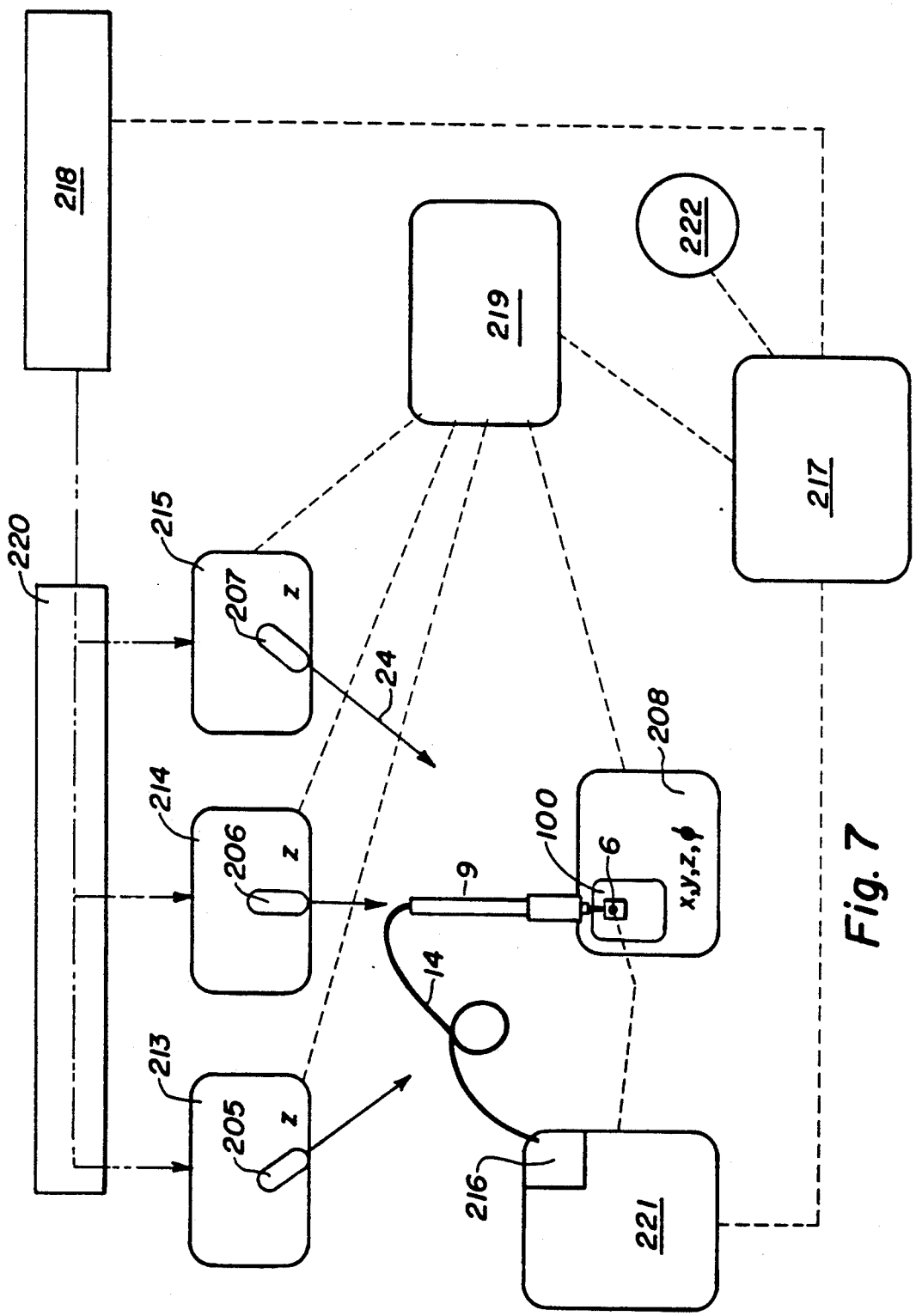
FIG. 7 is a schematic diagram of the control system for automatic control of an apparatus for performing the method of the invention.

Referring now to FIG. 7 the control system for the assembly apparatus 200 is under the overall coordination of a computer 217. This communicates as indicated by the dotted lines, with the laser welding source 218, a traverse controller 219 and optoelectronic instrumentation 221 including a detector 216 which is used to monitor the accuracy of alignment.

The traverse controller 219 is a functional part of the micromanipulator system and provides dedicated microcomputer control of six of the seven manipulators of the system. The seventh manipulator is for rotational motion, $\phi$, and is controlled by a stepper motor. Each of the six translation manipulators feeds back position information to the controller 219 via the encoder transducers described previously. The rotary stage has its location determined by proximity switches.

The laser welding source 218 is a high power coherent laser such as a pulsed YAG laser. The laser welding source 218 produces a single pulsed beam, which is uniformly split between the three collimators by a beam splitter 220 into three beams of equal power to allow three balanced welds to be made simultaneously.

The optoelectronic instrumentation 221 drives the laser 6 of the package 100. The fiber pigtail 14 is connected into the detector 216 and the instrumentation is then used to monitor the light coupled from the laser 6 into the fiber pigtail 14 during the alignment procedure.

The alignment and fixing procedure will now be described with particular reference to FIGS. 3 5, 6, 7, and 8.

A partially assembled package 100 (base 1, frame with wall 4, leads 17 and laser 6, photodetector 7 and temperature sensor 3 all mounted on pedestal 13) is clamped in the fixture 223 on the manipulating assembly 208. Appropriate electrical connections are made between the package and the instrumentation 221.

The previously fabricated feedthrough tube 9 with the optical fiber mounted therein is held at its upper end in the clamp 203. The lower end of the feedthrough tube 9 is passed through the sleeve spool 10 and the tubular flanged bushing 11 which are themselves held suspended above the partly assembled package 100 by a retaining mechanism 204 on the underside of the beam 202.

The Z stage 210 is then actuated to optically reference the top edge of the wall 4 to a predetermined initial datum. Although the alignment procedure is carried out automatically under the control of the computer 217, a monitor 222 is provided to assist in manual control and setup of the initial datum. As the various stages of the manipulating assembly 208 are referenced by optical encoders 225, 227, and 228, this reference datum can be recorded in the computer 217.

Next the Z-translator 210 is driven upwards so that the feedthrough tube 9 enters into the oversize hole 18 in the wall 4 until the lens at the end of fiber 16 is located at about 0.008 to 0.010 inches (ca. 250 microns) from the active facet of the laser 6. The free end of the fiber pigtail 14 is plugged into the detector 216 The package 100 is then aligned with the fiber optic feedthrough until optimum optical coupling is achieved as described below.

To identify the optimum alignment position, a search is carried out, preferably under automated control, using a search algorithm in three dimensions. With the laser 6 operating under low power, the computer program controls translators 210, 211, and 212 in X, Y, and Z coordinates as required to optimize the output of the laser 6 which is coupled into the pigtail 14 as sensed by the detector 216. The search, of course, may be manual using keyboard input to the control system or "joystick" control. In either circumstance, the optical coupling is optimized. A similar procedure may be followed in the assembly of a receiver package, when an external light source is substituted for the detector 216 and the amount of light coupled into the receiver is monitored.

The spool 10 is then released from the retaining mechanism 204 onto the external face of the wall 4 surrounding the oversize hole 18. A loose sliding fit of the inside diameter of the spool 10 on the outside diameter of the tube 9 facilitates this.

Figure 8:
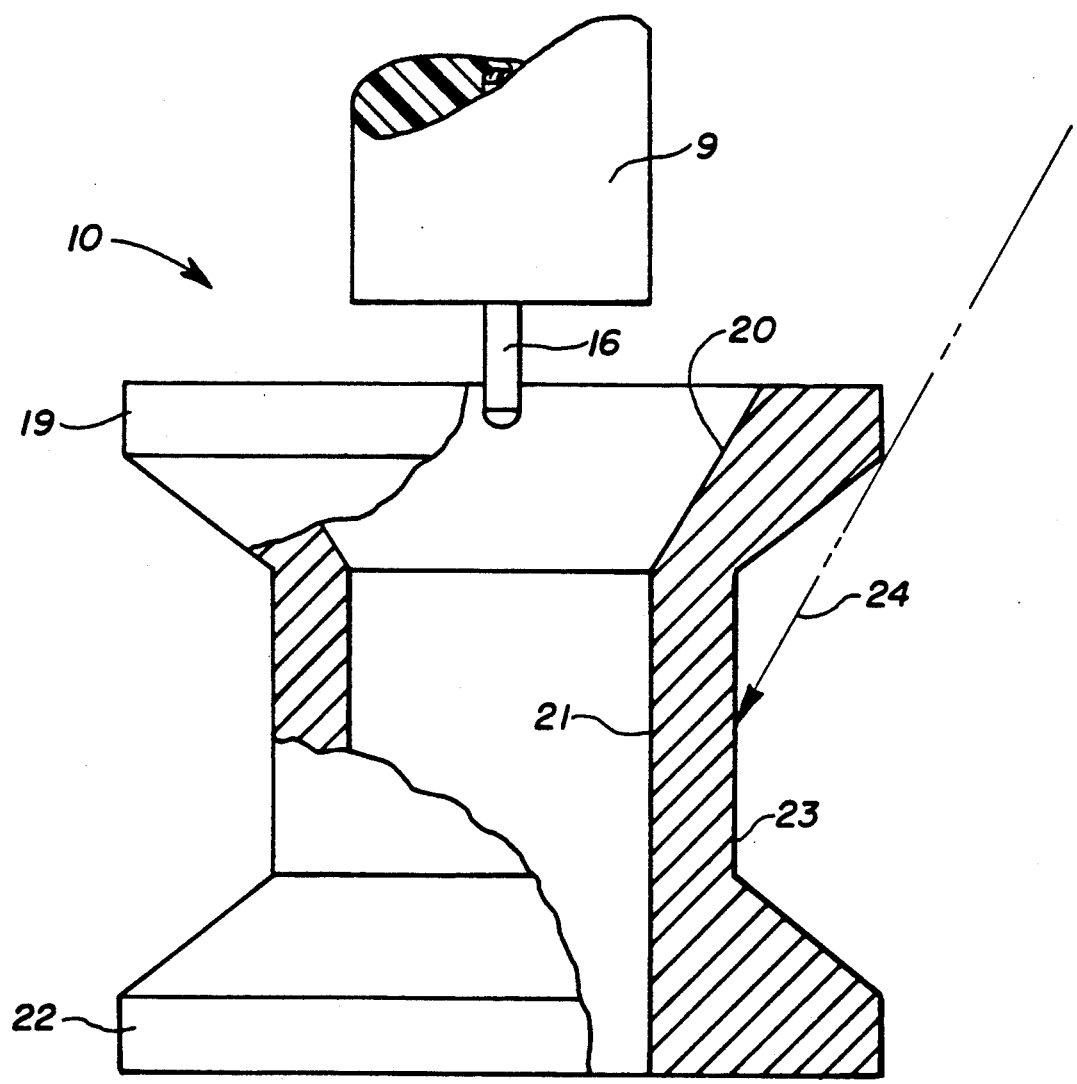
FIG. 8 is an enlarged elevational view in partial cross-section of a sleeve spool forming a first alignment means according to the invention.

A more detailed view of the sleeve spool 10 itself is shown in FIG. 8. The upper flange 19 is sufficiently wide to accommodate a tapered entry 20 so that there is reduced risk of damaging the lensed end of fiber optic core when the feedthrough tube 9 is initially guided into the bore 21 of the sleeve spool. At the other end of the spool 10, which contacts the wall 4, the lower flange 22 is sufficiently wide to cover the oversize hole 18. The barrel 23 of the spool 10 is thin-walled, such that when a laser welding beam is aimed at the mid-plane of the spool 10 as represented by the broken arrow 24, a weld is achieved through the barrel wall to the feedthrough tube 9. The width of the upper flange 19 is selected to allow the laser welding beams to just clear the flange during this critical welding step. However, it will be appreciated that the upper flange itself is merely a convenience to assembly. It can be dispensed with turning the "spool" into a "stepped washer," for example, without affect on the invention.

The laser welding optical collimators 205, 206, 207 are then driven in the Z direction so that the pre-aligned convergence of the three beams of coherent light will relate to the established datum at the upper face of the wall 4 to locate each beam on the outer perimeter of the lower flange 22 of the spool 10 The welding laser 218 is then actuated and three laser beams of equal energy are directed by the collimators to produce three fillet welds at 120 degree spacing, thus tacking the spool 10 to the wall 4.

The optical alignment is then rechecked, and X and Y adjustments made if necessary, by applying leverage to elastically and plastically deform the welds. The clearance of the feedthrough tube 9 in the spool 10 and its flexibility permit this. The placement of the clamp 203 near the end of the feedthrough tube 9 remote from the wall 4, allows adequate leverage to be applied against the lower flange 22 of the spool. It will be appreciated that it is the movement of the package 100 relative to the clamp 203 which effects the leverage In this case, it is the package 100 mounted in the fixture 223 which is actually moved to apply the leverage if required, but the equivalent result may equally be achieved by moving the clamp 203.

The provision of a tapered hemi-spherical lens on the end of the optical fiber 16 means that any small angle tilting of the end of the fiber 16 owing to the levered readjustment does not significantly affect the lens to laser optical coupling relationship.

At this time, the fiber to laser spacing in the Z-axis is preferably controlled to be at the maximum limit of the desired range of tolerance. This is to allow for any Z direction motion towards the laser 6 which may occur due to weld shrinkage after the spool 10 is welded to the feedthrough tube 9 in the next step.

In this step, the laser welding optical collimators 205 206, and 207 are traversed upwards along the Z axis until their beams can be made to impinge on the midplane of the barrel 23 of the spool 10. Laser spot welding is then done at three radially separated points 120 degrees apart tacking the spool to the feedthrough tube 9. As noted above because the spool 10 is relatively thin at this point the welds tack the spool 10 to the outside diameter of tube 9 forming essentially radial welds despite the incident angle of the coherent laser welding beams. The inventors have found that the simultaneously made mid-plane welds also shrink radially rather than axially and do not move the tube 9 substantially in the Z direction. This is a particular advantage.

In contrast, the filled spot welds placed between the flange 23 of the spool 10 and the face of the wall 4 tend to have major shrinkage components in the Z direction. Significant axial compensation would be required in realignment if these welds were made after welding of the spool 10 to the feedthrough tube 9. Likewise, if fillet welds were made between the inside surface of the upper flange 19 of the spool 10 and the feedthrough tube 9 similar Z axis shrinkage would be likely to occur, demanding significant readjustment during retuning of the alignment. The central welding of the spool therefore reduces the extent of realignment which is generally required.

At this stage, optionally, the clamp 203 is opened and the rotational stage 209 turned 60 degrees. The clamp 203 is then reclosed and returning is done as before, after which three additional laser fillet welds are made between the sleeve spool 10 and the wall 4. Further retuning is then done as necessary, following which the clamp 203 is again released and a rotational sweep of at least 120 degrees is made during which overlapping welds are laid down to seam weld the spool 10 to the wall 4. Optionally also, the mid-spool spot welds are similarly converted to provide an hermetic seal with a seam weld. It should be noted that after each welding step the alignment is checked and readjusted, if necessary, before the next welding step is undertaken.

In the next step, the tubular flanged bushing 1 is released from the retaining mechanism 204 onto the wall 1. The alignment is again checked and any readjustment, usually minimal, is done. The laser welding optics are then positioned to place three welds to fix the tubular bushing 11 to the wall 4. After a further retuning of the alignment, the laser welding optics are moved up to tack the tubular bushing 11 to the feedthrough tube 9 at its upper end. A final check of the alignment is done.

The tubular bushing 11 is then firmly fixed in a similar manner to that described above for optionally circumferentially fixing and sealing the sleeve spool 10. The clamp 203 is released and the rotational stage 209 is turned 60 degrees. Three more tack welds are placed followed by a sweep of at least 120 degrees of overlapping welds to hermetically seal the upper end of the tubular bushing 11 to the feedthrough tube 9. At this stage rigidity is established, and further adjustment is not required.

The laser weld optics are again lowered to the reference datum, a 60 degree turn made, and three more tack welds are placed followed by a sweep of at least 120 degrees of overlapping welds to hermetically seal the tubular bushing 11 to the wall 4. Now the fiber optic feedthrough is fully captured and hermetically sealed.

In this assembly according to the invention the tubular bushing 11 provides a second anchorage to the wall 4 and to the feedthrough tube 9 for rigidity and hermetic sealing. Additionally, if the stool 10 is seam-welded to the wall 4 and to the feedthrough tube 9 as described, a second level of sealing is provided.

Following electrical check-out, the assembly is then removed from the fixture 223 for further processing, such as, for example, seam welding of the lid 12 to the package.

The procedure above is amenable to and preferably subject to automatic control. However, the procedure is equally effective under manual operator control.

The precise sequence of fixing steps is not unchangeable and may be varied to some degree, so long as a first alignment means (e.g. the spool 10) is fixed relatively close to the component and secures a primary alignment, which may be adjusted, and subsequently a second alignment means (e.g. the tubular bushing) is fixed further from the component to secure the final alignment.

FIG. 9 illustrates the main features of one alternative embodiment of the invention in the principal stages of assembly.

Figure 9A:
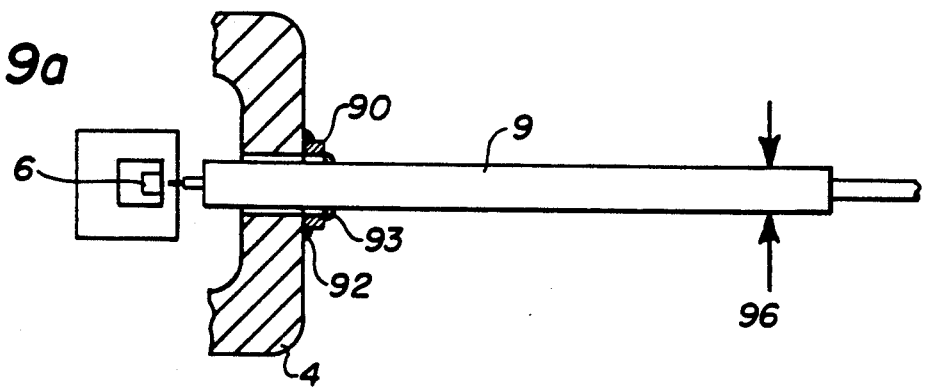
FIGS. 9a-9c illustrate the securing steps with an alternative embodiment of the invention.
Figure 9B:
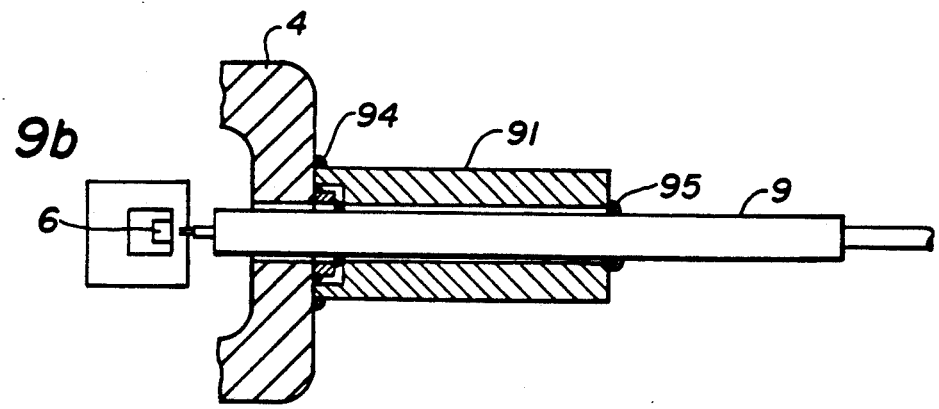
Figure 9C:
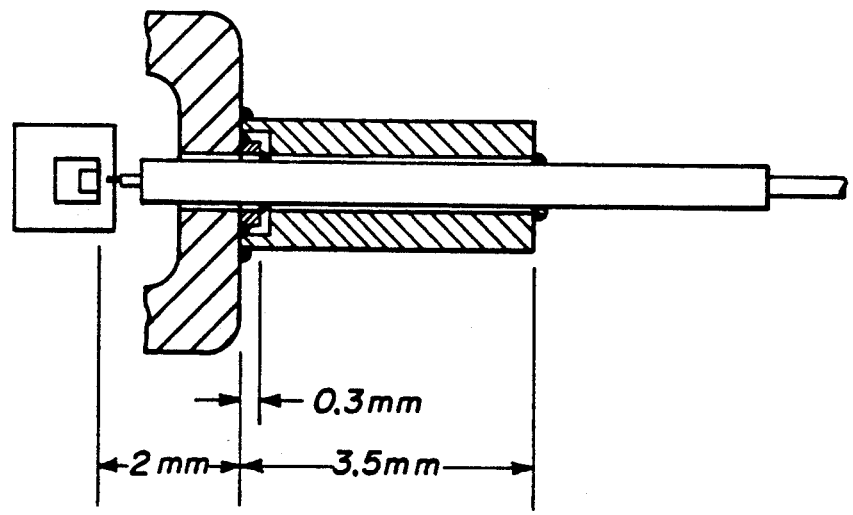

In this embodiment, the sleeve spool is replaced by a simple flat bushing, or washer, 90, which secures the primary alignment as shown in FIG. 9(a). The fixings 92, 93, preferably laser welds, may be deformed in order to readjust the alignment by applying leverage as described above. To do this the feedthrough tube 9 is appropriately clamped towards the end remote from the laser 6 as symbolized by the arrows 96. Final alignment is subsequently secured as shown in FIG. 9(b), using a tubular bushing 91 which is fixed at both ends 94, 95 again preferably by laser welds. FIG. 9(c) illustrates the final aligned configuration with typical major dimensions indicated. As shown, the washer 90 which is approximately 0.3 mm thick is fixed to the external face of the wall 4 which is about 2 mm from the laser 6. The tubular bushing being 3.5 mm long is therefore fixed to the feedthrough tube 9 substantially further from the laser at about 5.5 mm distant. This extra length is sufficient that any distortions of the final fixing 95 have a correspondingly reduced effect on the alignment at the laser 6.

FIG. 10 illustrates some further alternative embodiments which utilize the principles of the present invention. All these embodiments clearly provide two alignment means of which the second 102, 104, 106, 108 is fixed to the feedthrough tube 9 substantially further from the laser 6 than the first 101, 103, 105, 107. All allow for the realignment leverage when the feedthrough tube is appropriately clamped.

Figure 10A:
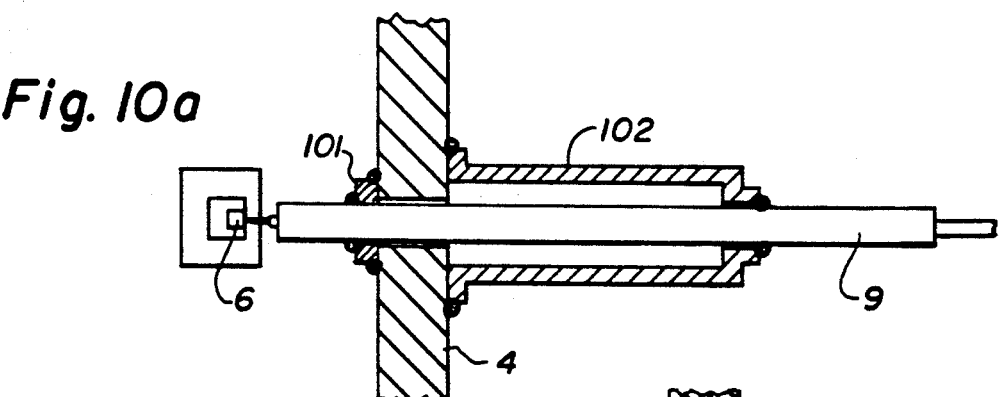
FIGS. 10a-10d illustrate further alternative embodiments of the invention.
Figure 10B:
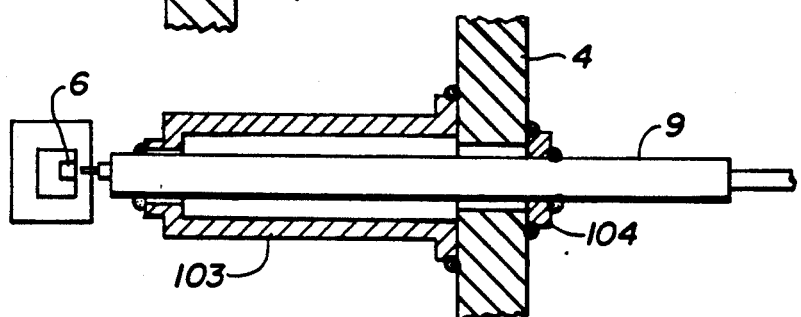
Figure 10C:
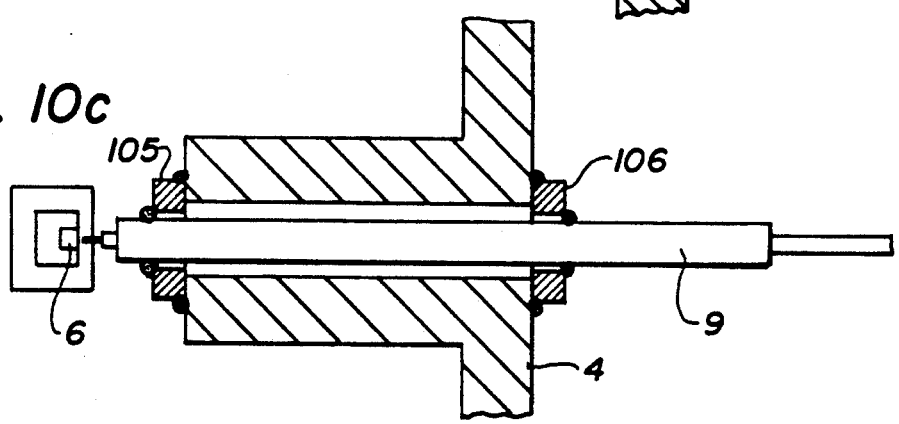
Figure 10D:
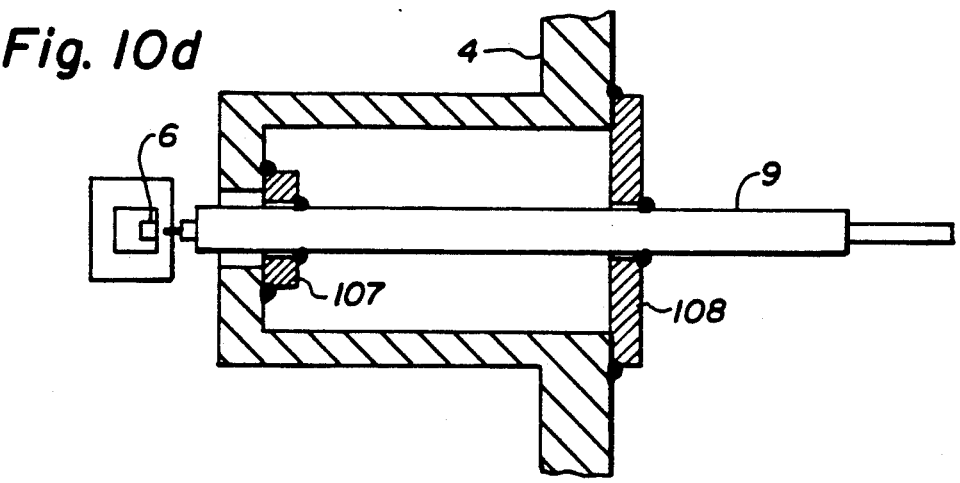

FIGS. 10(a), (b), and (c) illustrate that it is not essential for either or both alignment means to be fixed to the same exterior face of the wall 4. As shown, the alignment means may, for example, be on opposite faces of the wall 4 without departing from the invention. The embodiments of FIGS. 10(c) and (d) further illustrate that it is not necessary for either alignment means to be elongated. In these embodiments both first 105, 107 and second 106, 108 alignment means are simple washer-like bushings and the separation between the relevant points of fixing to the feedthrough tube 9 is provided by modifying the structure of the wall 4. The same effect may equally be achieved by merely making the wall 4 thicker.

Figure 11:
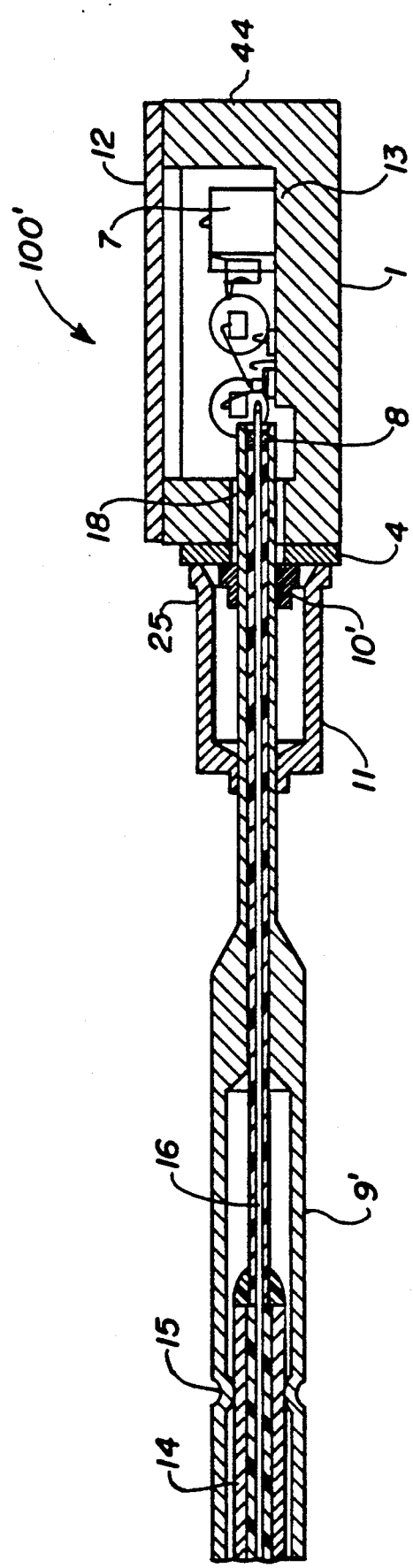
FIGS. 11 and 12 are views respectively similar to FIGS. 1 and 2 illustrating an alternate embodiment of the device in accordance with the present invention.
Figure 12:
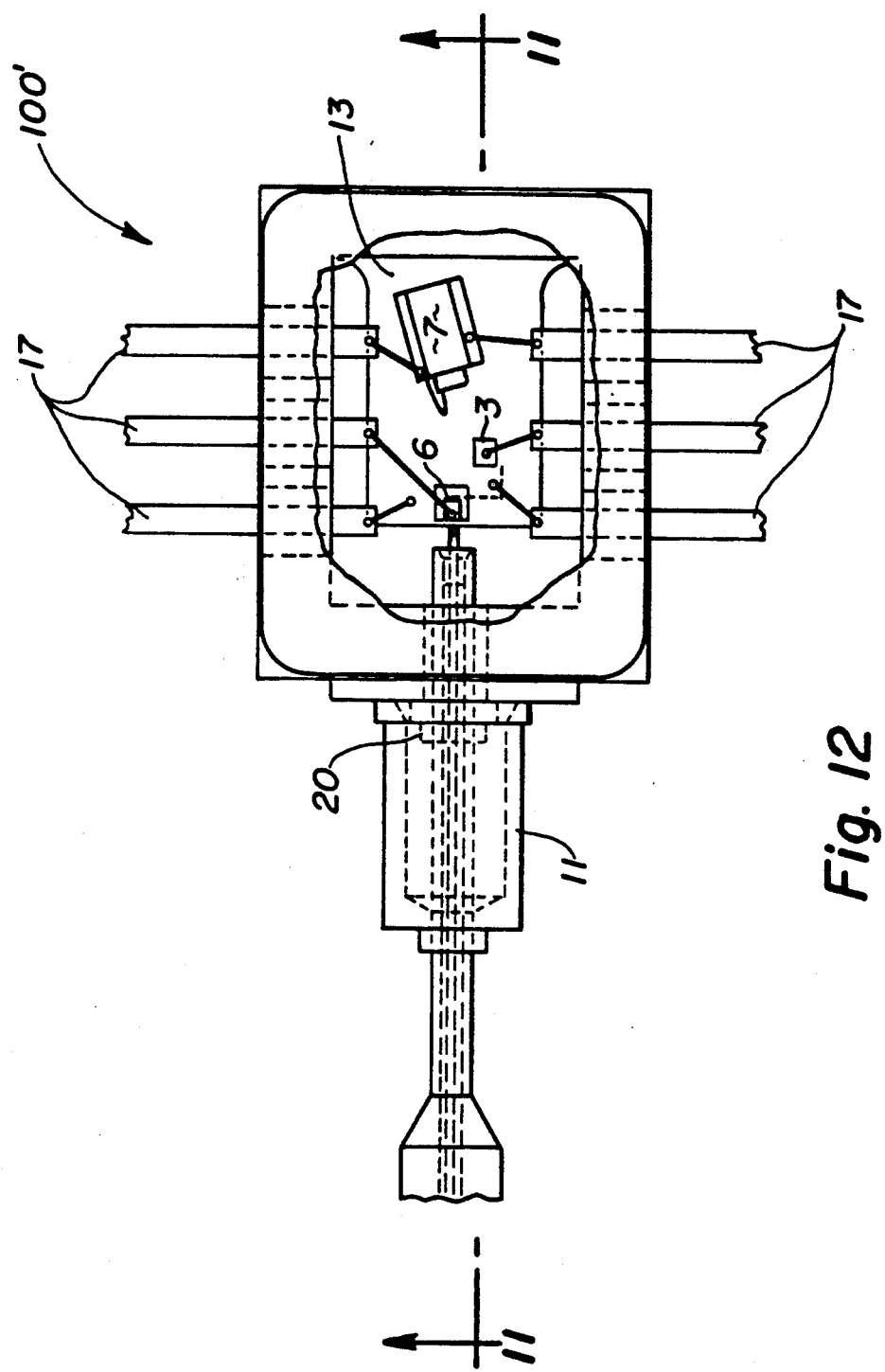

FIGS. 11 and 12 are views generally similar to those shown in FIGS. 1 and 2, respectively, and illustrate a modified structural arrangement for a optoelectronic package 100'. In the embodiment shown in FIGS. 11 and 12 the spool 10 has been replaced by the stepped washer 10', as discussed above. In addition greater flexibility is imparted to the feedthrough assembly 9' by utilizing the teachings of the invention disclosed and claimed in copending U.S. application Ser. No. 147,830, filed Jan. 25, 1988 (ED-0360) now U.S. Pat. No. 4,865,410, issued Apr. 12, 1989. The thickness dimension of the stepped washer 10' is preferably equal to the thickness dimension of the tube of the feedthrough assembly 9'.

In accordance with a more preferred method of manufacture to be described more precise and predictable alignment of the fiber can be achieved.

The method to be described generally follows in accordance with that described earlier, with the exceptions that final alignment between the end of the fiber and the optical component is postponed until both the first and the second alignment means have been attached to the wall of the package and to the feedthrough. Thereafter optical coupling is achieved by deforming the portion of the feedthrough member projecting into the housing past its elastic limit using a leveraging device to be described. Using the teachings of the more preferred method of manufacture distortions can be controlled predicted and compensated resulting in more accurate alignment of the end of the fiber in directions both along the axis of the fiber and in directions radial thereto. Alignment in directions radial to the axis of the fiber to within plus or minus one tenth (0.1) micrometer can be achieved.

In accordance with the modified method, as in the case of the method earlier described, the end of the optical fiber is inserted through the aperture in the wall of the package such that a predetermined portion of the same projects therethrough. The end of the fiber is initially positioned in an optically coupled relationship with the optical component in the manner discussed earlier. Thereafter the fiber is withdrawn axially a predetermined distance from the component. The magnitude of the withdrawal is determined on an ad hoc basis for the particular package configuration (i.e., geometric design and materials used) being fabricated. However, as in the case of the previously described method the withdrawal is necessary in order to accommodate for shrinkage of the welds in the axial direction of the fiber. It has been found that, in anticipation of axial shrinkage of the welds, it is more advantageous to withdraw the end of the fiber too great a distance rather than too small a distance from the component. This is so because it has been observed that the optical coupling between the end of the fiber and the component falls off in a rather precipitous manner as one moves toward the component from the point of maximum optical coupling reducing the distance between the end of the fiber and the component. However, the optical coupling is substantially constant for some distance as one moves away from the point of maximum optical coupling, increasing the distance between the end of the fiber and the component.

Once the optical coupling has been achieved, and the fiber end axially withdrawn the predetermined distance from the point of maximum coupling, the stepped washer 10' is secured both to the wall and to the feedthrough, in the manner discussed above using the simultaneous and radially balanced laser welds. The point of application of welding energy to the stepped washer 10' is the junction of the parts being welded rather than being directed toward the mid plane of the spool as in the method earlier described.

The second alignment member, the tubular flanged bushing 11, is then secured to both the wall of the package and to the feedthrough, as described.

Once the structure of the package 100' is formed in the manner described, final optical adjustment (if necessary) of the fiber to the component is effected. In general this final adjustment is made by iteratively bending the projecting portion of the feedthrough tube (i.e., the portion of the tube within the package) past its elastic limit until the lensed end of the fiber is maintained in a position substantially close to its optimally coupled position with respect to the component. The leveraging of the projecting portion of the feedthrough tube may be accomplished manually or by the use of the apparatus shown in FIGS. 13 to 15.

Figure 13:
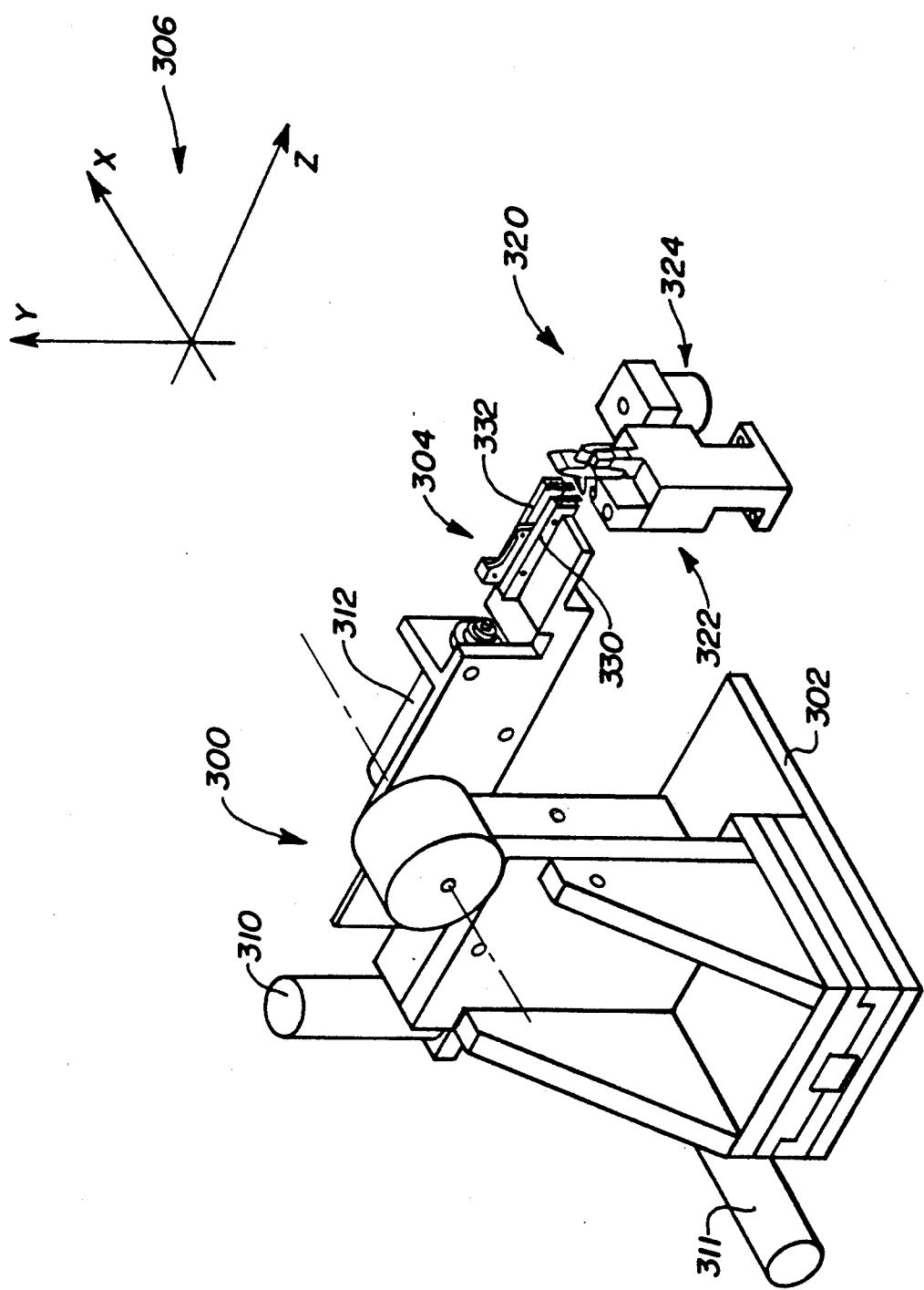
FIGS. 13 through 15 are views of an apparatus for manipulating the projecting portion of the feedthrough in accordance with an alternate embodiment of the present invention.
Figure 14:
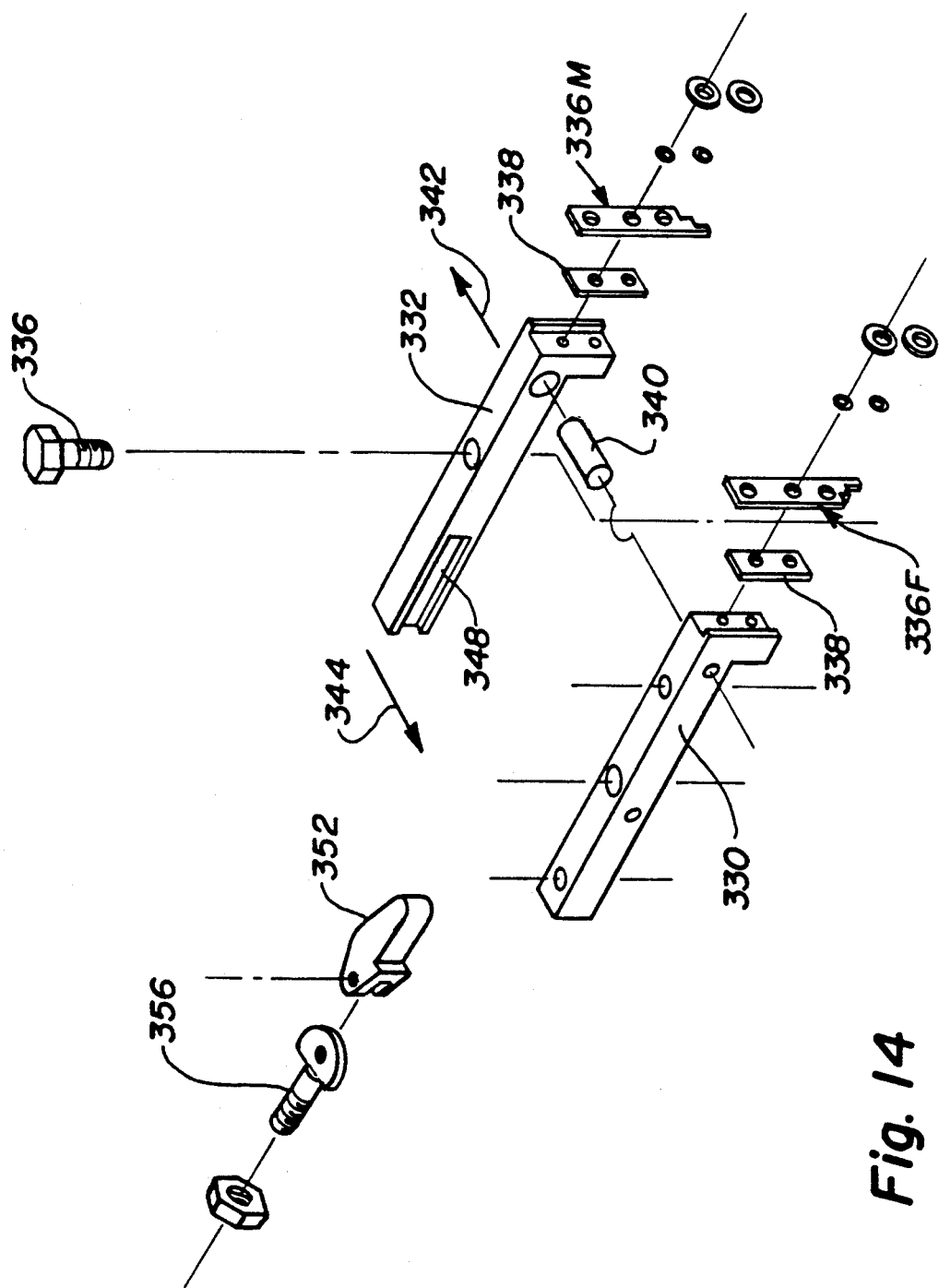

As seen in FIG. 13 the apparatus 300 includes a mounting block 320 having a clamp arrangement 322 in which the pigtailed component is fixed. The block 320 includes a detector 324 which is connected to the optical fiber of the feedthrough. The apparatus 300 also includes a frame 302 on which a platform 304 is movable in orthogonal directions with respect to the X and Y reference axes shown in the reference coordinates 306 by means of actuators 311 and 310, respectively. The platform 304 carries an actuator 312.

The platform 304 has affixed thereto a stationary arm 330 and a movable arm 332. These members are believed best seen in FIG. 14. The movable arm 332 is pivotally mounted to the platform by a pivot pin 336. A finger 336F and 336M is connected at the forward end of each of the respective fixed arm 330 and the movable arm 332. An insulating pad 338 is disposed between the finger 336F and 336M and their respective arms to electrically insulate the fingers from the same. The arms are biased by a spring 340 which imposes an opening force in the direction 342 on the end of the arms having the fingers thereon and a corresponding closing force acting in the direction 344 on the opposite ends of the arms. The end of the arm 332 opposite the finger 336 M is grooved, as at 348 to receive a cam 352. The cam 352 is itself connected by a rod 356 to the actuator 312. It should be readily appreciated that movement of the cam 352 in the positive Z direction causes the fingers to move together (i.e., in a direction opposite the direction 342), while retraction of the cam 352 under the control of the actuator 312 forces apart the rear of the fingers to close the same. Although the arm 330 is shown as being stationary with respect to the platform it should be understood that this need not be the case and both arms could be movable with respect to the platform. It should also be understood that only one of the fingers need be notched. Moreover the shape of the notch is merely illustrative.

Figure 15:
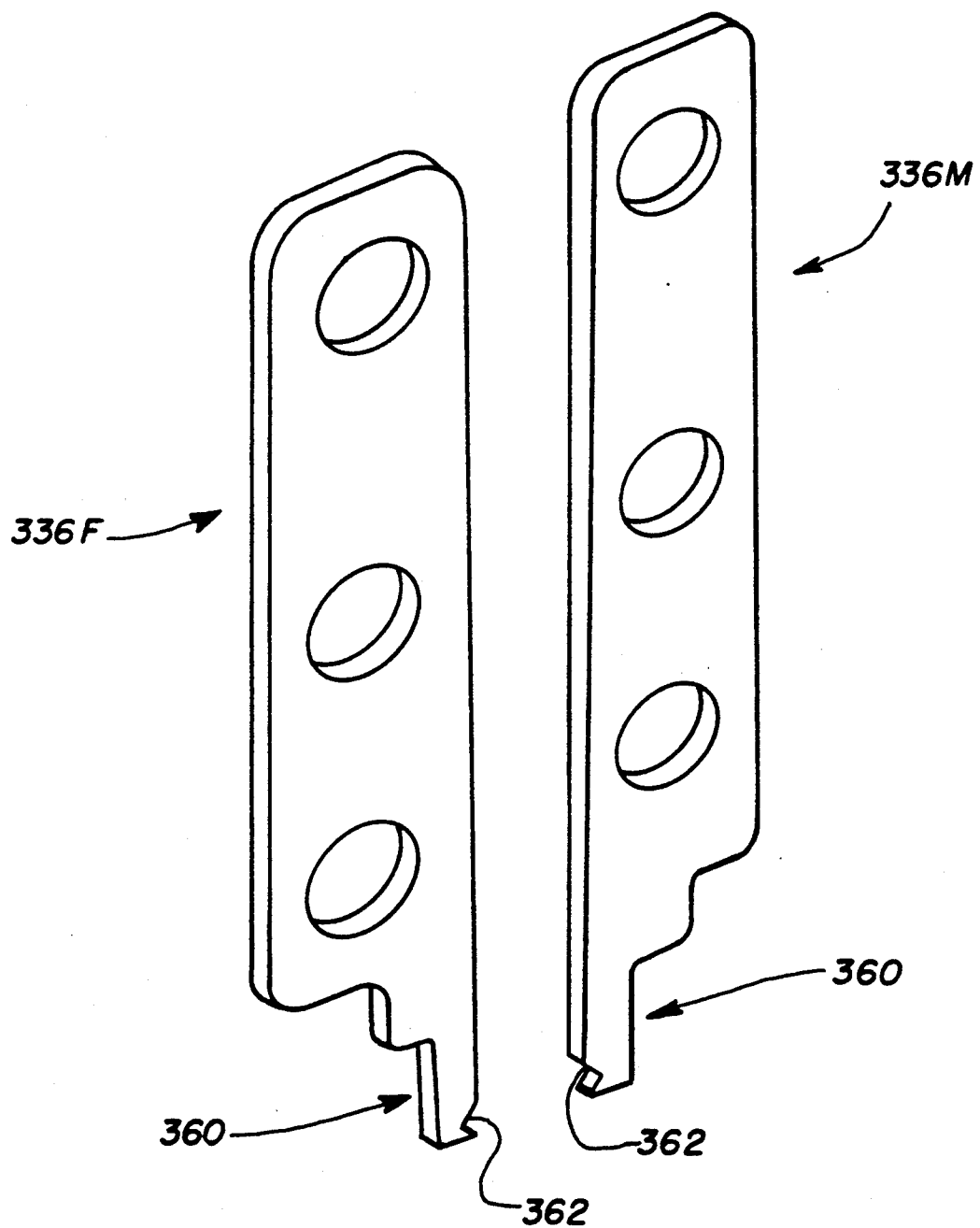

With reference to FIG. 15, an enlarged isometric view of the fingers 336F and 336M is shown. Each of the fingers has a narrow depending portion 360 that is provided with a notch 362 adjacent the end thereof The notches are disposed in confrontational relationship The more preferred method of manufacture will be described with reference to a transmitter package. In this instance, the transmitting optical component in the package is switched on to produce an optical output. With the package positioned in the clamp 322, the platform 304 is lowered into the open top of the package through use of the actuators 310, 311, thereby disposing the fingers 336M and 336F in generally bracketing relationship with respect to the projecting portion of the feedthrough tube. The cam 352 is extended, closing the fingers 336 and causing the same to clasp the projecting portion of the tube in the notches 362. During this operation the package is grounded while an electrical potential is independently applied to each finger. Current flow through the finger indicates contact between the tube and that finger. The position in space at which the projecting end of the tube is grasped by the fingers is recorded by suitable position sensing devices operatively associated with the actuators. This point defines a "home" position.

Once the tube is so grasped the actuators are moved in a predetermined search pattern similar to that discussed earlier in a manner which establishes the optimal optical coupling between the lensed end of the fiber and the component. In this endeavor the degree of optical coupling is measured by the intensity of light transmitted from the component through the fiber as detected by the detector 324. This monitoring of the optical coupling could continuously occur throughout the practice of the method. The displacement from the home position and the position of optimal optical coupling defines a vector.

The grip of the fingers may be opened slightly to partially release the projecting end or the fingers may continue to grasp the projecting portion of the feedthrough. Partially releasing is preferred. The actuators are thereafter energized to move the projecting end of the tube along the vector for a predetermined distance sufficient to bend the same past its elastic limit. By "partially releasing" it is meant that one or both of the fingers move away from the feedthrough tube with the fingers still generally bracketing the feedthrough. Contact may or may not be broken. It should be appreciated displacement "along the vector" is meant to include independent sequential or alternative displacements along one or both of the orthogonal components of the vector.

Once the tube is bent past its elastic limit contact between the finger or fingers and the projecting end of the tube is broken and the tube permitted to return to a rest position. If the tube has been grasped by the fingers this is accomplished by completely releasing the tube. If the fingers were already partially released this is accomplished by reversing the previous motion of the fingers until contact is broken.

If necessary as determined by the level of coupled power the tube is again displaced in a direction and for a distance such that when the tube is allowed to return to a rest position the level of coupled optical power is increased. The tube may be displaced by either by contact with one or both the fingers in their slightly opened state or by regrasping the tube. If the tube had been moved directly along the vector it is likely that the tube will be regrasped by both fingers. If the movement along the vector is being effected by displacements along its components with the finger in the partialled release state then it is likely that the tube need no be regrasped but need only be again abutted by one or both fingers.

This sequence of iterations is repeated as many times as necessary until the end of the fiber reposes within a predetermined close distance from the position of optimal optical coupling. The final position of repose will likely be based upon some threshold power level (e.g., 0.5 db of the power level at the optimal coupling position). It has been found that if the tube is annealed it is more readily bendable past its elastic limit toward the position of optimal optical coupling.

It should readily be appreciated that if a receiver package is being manufactured an independent light source would be used to provide an optical signal through the fiber. The optical signal is detected by the receiving component in the package. The electrical output of the receiving component is monitored by similar instrumentation as used for the detector 324. In practice, the final realignment of a receiving component to the fiber may not be necessary.

It should also be appreciated that optical amplifiers modulators, switches, or any other arrangement wherein optical coupling between an optical fiber and an optical component (including another optical fiber, as in a splice) is desired may be manufactured using the methods described herein.

It will be appreciated that the embodiments described herein represent only a few of the large range of alternative embodiments falling within the scope of the invention.

What is claimed is:

1. An optical fiber assembly comprising:
    an optical fiber having an end portion secured in a feedthrough member;
    an optical component mounting having an optical component mounted thereon and having a wall member provided with an aperture therein, the end portion of the optical fiber extending through the aperture and being aligned in optically coupled relationship with the component, the wall having a first surface thereon facing away from the component; and
    first alignment mean for securing a primary alignment of the end of the fiber with the component and second alignment means for securing a subsequent secondary alignment;
    wherein the alignment means are both secured to the wall member on the surface thereof facing away from the component and to the feedthrough member, the first alignment means being secured to the feedthrough member proximate to the component, and the second alignment means being secured thereafter to the feedthrough member at a relatively greater distance form the component.

2. An assembly according to claim 1 wherein the first and second alignment means comprise first and second bushing members.

3. An assembly according to claim 2 wherein the first bushing member coaxially encloses and is a close fit on the feedthrough member.

4. An assembly according to claim 3 wherein the second bushing member is axially elongate, is secured to the wall member and encloses the first bushing member at the end proximate to the component, and is secured to the feedthrough member at the end remote from the component.

5. An assembly according to claim 4 wherein at least one alignment means is secured to the feedthrough member by welds.

6. An assembly according to claim 4 wherein at least one alignment means is secured to the wall member by welds.

7. An assembly according to claim 4 wherein the welds are radially balanced.

8. An assembly according to claim 7 wherein the welds provide a circumferential seal.

9. An assembly according to claim 2 wherein the first bushing member comprises a sleeve spool, having a flange at one end and a barrel portion extending out from the flange, wherein the flange is secured to the wall member and the barrel portion is secured to the feedthrough member.

10. An assembly according to claim 1 wherein the component is a semiconductor laser.

11. An optical fiber assembly comprising
    a package for an opto-electronic device including a frame with a wall having a hole therein;
    an opto-electronic device mounted within the frame with a facet of the device facing the hole in the wall;
    an optical fiber having a lensed end thereon the optical fiber being rigidly fixed and hermetically sealed in a metallic tube, the lensed end of the optical fiber being disposed within the frame and optically aligned with the facet of the device; and
    a spool having a reduced dimension portion thereon spaced from one end thereof the one end of the spool abutting the wall and covering the hole therein, the reduced dimension portion of the spool surrounding the metallic tube, the spool being attached to :he wall at one end thereof, and the spool being attached to the tube in the vicinity of the reduced dimension portion thereof by at least two radially balanced welds such that any stresses imposed by the welds on the tube and the spool are balanced.

12. An assembly according to claim 11 wherein the attachment of the spool to the tube comprises a plurality of radially balanced spot welds each of which flows into at least one adjacent spot weld to form a continuous bond between the spool and the tube thereby to hermetically seal the spool to the tube.

13. An assembly according to claim 11 wherein the attachment of the spool to the wall comprises a plurality of spot welds each of which flows into at least one adjacent spot weld to form a continuous bond between the spool and the wall thereby to hermetically seal the spool to the wall.

14. An assembly according to claim 11 wherein the attachment of the spool to the wall comprises a seam weld which forms a continuous bond between the spool and the wall thereby to hermetically seal the spool to the wall.

15. An assembly according to claim 11 further comprising a support bushing having an opening at one end thereof and an enlarged recess therein, the spool being accepted within the recess and surrounded by the bushing, the metallic tube extending through the opening in the bushing the bushing being attached and hermetically sealed to the tube and to the wall.

16. An assembly according to claim 15 wherein the attachments between the bushing and the tube and between the bushing and the wall each comprise a seam weld which forms a continuous bond thereby to hermetically seal the tube to the bushing and the bushing to the wall.

17. A method of aligning and fixing in optically coupled relationship an optical fiber having an end portion secured in a feedthrough member and an optical component mounted on a component mounting having a wall member provided with an aperture therein, the wall wall having a first surface thereon facing away from the component, the method comprising the steps of:
  (a) positioning the optical fiber end portion in the feedthrough member in the aperture and aligning the fiber in optically coupled relationship with the component;
  (b) securing the first alignment means to the wall member on the surface thereof facing away from the component;
  (c) securing the alignment means to the feedthrough member at a first fixing region thereof proximate to the component;
  (d) checking the optically coupled relationship and realigning the fiber, if necessary, by applying appropriate leverage forces with the feedthrough member clamped further from the component that the first fixing region thereby distorting the securement of the first alignment means in order to reattain said relationship;
  (e) securing second alignment means to the wall member on the surface thereof facing away from the component; and
  (f) securing the second alignment means to the feedthrough member at a second, distal fixing region thereof remote from the component and the first fixing region.

18. A method according to claim 17 in which any of the securing steps comprises laser welding.

19. A method according to claim 17 including providing first and second alignment means comprising bushing members which extend circumferentially around the feedthrough member and wherein any of the securing steps comprises securing said bushing members with radially balanced welds.

20. A method according to claim 19 including circumferentially securing at least one of the bushing members to the wall member and to the feedthrough member with welds, thereby providing an hermetic seal between the wall member and the feedthrough member.

21. A method for aligning the lensed end of an optical fiber itself rigidly fixed and hermetically sealed within a metallic tube with respect to a light emitting region on a facet of a semiconductor laser itself mounted within a frame, and fixing and hermetically sealing the metallic tube to the frame,
  the frame having a wall with a hole therein whereby access to the interior of the frame may be had,
  and the tube having a spool thereon with reduced dimension portion thereon intermediate the ends thereof,
  and for fixing and hermetically sealing the metallic tube to the wall of the frame via the spool,
  the alignment, fixing and sealing occurring at room temperature with the laser operational to emit light,
  the method comprising the steps of:
  (a) sliding the spool over the metallic tube;
  (b) relatively moving the frame and the metallic tube to cause the lensed end of the fiber to project through the hole and into proximity with the light emitting region of the laser;
  (c) aligning the lensed end of the fiber with the region of the laser to optimize the coupling of light from the laser into the fiber;
  (d) sliding the spool with respect to the metallic tube to abut one end of the spool against the wall such that the end of the spool completely covers the hole in the wall;
  (e) applying laser energy simultaneously in substantially equal magnitude at each of a first set of locations comprising at least two locations thereby to weld the spool to the wall at the first set of locations such that there occurs minimal radial fiber and the laser upon cooling of the welds;
  (f) again aligning the lensed end of the fiber with respect to the laser to correct any misalignment occurring therebetween as a result of the laser welding at the first set of locations;
  (g) applying laser energy simultaneously in substantially equal magnitude to each of a second set of locations comprising at least two locations thereby to weld the spool to the metallic tube the laser energy being directed through the reduced dimension portion of the spool such that, upon cooling of the welds at the second set of locations displacement of the tube relative to the spool is substantially eliminated: and
  (h) again aligning the lensed end of the fiber with respect to the laser die to correct any misalignment occurring therebetween as a result of the laser welding at the second set of locations.

22. A method according to claim 21 comprising after step (h) the steps of:
  (i) applying laser energy simultaneously in substantially equal magnitude at each of a third set of locations equal in number to the number of locations in the first set, each of the locations in the third set being intermediate a pair of locations in the first set, thereby to weld the spool to the wall at the third set of locations such that there occurs minimal misalignment between the lensed end of the fiber and the laser upon cooling of the welds at the third set of locations:

(j) again aligning the lensed end of the fiber with respect to the laser to correct any misalignment occurring therebetween as a result of the laser welding at the third set of locations;

(k) applying laser energy simultaneously in substantially equal magnitude at each of a fourth set of locations equal in number to the number of locations in the second set each of the locations in the fourth set being intermediate a pair of locations in the second set, thereby to weld the spool to the metallic tube at the fourth set of locations, the laser energy being directed though the reduced dimension portion of the spool such that, upon cooling of the welds at the fourth set of locations, displacement of the tube relative to the spool is substantially eliminated; and (l) again aligning the lensed end of the fiber with respect to the laser to correct any misalignment occurring therebetween as a result of the laser welding at the fourth set of locations.

23. A method according to claim 22 further comprising after step (1) the step of: seam welding the spool to the wall of the frame and the spool to the metallic tube thereby to hermetically seal the same.

24. A method according to claim 22 wherein the metallic tube is mounted in a rigid fixture and the frame is mounted in a second fixture movable with respect thereto, and wherein the alignment steps (c), (f), (h), (j) and (l) are accomplished by moving the frame with respect to the fixed end of the tube.

25. A method according to claim 22 wherein the frame is mounted in a rigid fixture and the free end of the metallic tube opposite the lensed end of the fiber is mounted in a second fixture movable with respect to the frame, and wherein the alignment steps (c), (f), (h), (j) and (l) are accomplished by manipulating the free end of the tube.

26. A method according to claim 22 wherein the frame is mounted in a rigid fixture and the free end of the metallic tube opposite the lensed end of the fiber is mounted in a second fixture movable with respect to the frame, with the length of the metallic tube between the free end and the spool being greater than the length of the tube between the lensed end of the fiber and the spool, and wherein the alignment steps (c), (f), (h), (j) and (l) are accomplished by manipulating the free end of the tube such that movement of the free end of the tube for a predetermined distance results in movement of the lensed end of the fiber for a distance that is reduced in proportion to the ratio of the lengths.

27. A method according to claim 21 further comprising after step (h) the step of: seam welding the spool to the wall of the frame and the spool to the metallic tube thereby to hermetically seal the same.

28. A method according to claim 21 wherein the metallic tube is mounted in a rigid fixture and the frame is mounted in a second fixture movable with respect thereto, and wherein the alignment steps (c), (f) and (h) are accomplished by moving the frame with respect to the fixed end of the tube.

29. A method according to claim 21 wherein the frame is mounted in a rigid fixture and the free end of the metallic tube opposite the lensed end of the fiber is mounted in a second fixture movable with respect to the frame, and wherein the alignment steps (c), (f) and (h) are accomplished by manipulating the free end of the tube.

30. A method according to claim 21 wherein the frame is mounted in a rigid fixture and the free end of the metallic tube opposite the lensed end of the fiber is mounted in a second fixture movable with respect to the frame, with the length of the metallic tube between the free end and the spool being greater than the length of the tube between the lensed end of the fiber and the spool, and wherein the alignment steps (c), (f) and (h) are accomplished by manipulating the free end of the tube such that movement of the free end of the tube for a predetermined distance results in movement of the lensed end of the fiber for a distance that is reduced in proportion to the ratio of the lengths.

31. A method for aligning the lensed end of an optical fiber itself rigidly mounted and hermetically sealed within a metallic tube with respect to a light emitting region on a facet of a semiconductor laser itself mounted within a frame, the frame having a wall with a hole therein whereby access to the interior of the frame may be had, the tube having thereon a spool having a reduced dimension portion intermediate the ends thereof, a support bushing slidable on the tube, the bushing having a recess sized to accept the spool therein, and for fixing the metallic tube to the wall of the frame via the spool, and for hermetically sealing the tube to the wall via the bushing, the alignment, fixing and sealing occurring at room temperature with the laser operational to emit light, the method comprising the steps of:

(a) sliding first the bushing and then the spool over the metallic tube;

(b) relatively moving the frame and the metallic tube to cause the lensed end of the fiber to project through the hole and into proximity with the light emitting region of the laser;

(c) aligning the lensed end of the fiber with the region of the laser to optimize the coupling of light from the laser into the fiber;

(d) sliding the spool with respect to the metallic tube to abut one end of the spool against the wall such that the end of the spool completely covers the hole in the frame;

(e) applying laser energy simultaneously in substantially equal magnitude at each of a first set of locations comprising at least two locations thereby to weld the spool to the wall at the first set of locations such that there occurs minimal radial misalignment between the lensed end of the fiber and the laser upon cooling of the welds;

(f) again aligning the lensed end of the fiber with respect to the laser to correct any misalignment occurring therebetween as a result of the laser welding at the first set of locations;

(g) applying laser energy simultaneously in substantially equal magnitude at each of a second seat of locations comprising at least two locations thereby to weld the spool to the metallic tube, the laser energy being directed through the reduced dimension portion of the spool such that, upon cooling of the welds at the second set of locations, displacement of the tube relative to the spool s substantially eliminated;

(h) again aligning the lensed end of the fiber with respect to the laser to correct any misalignment occurring therebetween as a result of the laser welding at the second set of locations;

(i) sliding the bushing with respect to the metallic tube and over the spool to abut one end of the bushing against the wall;

(j) seam welding one end of the bushing to the wall and the other end of the bushing to the tube thereby to hermetically seal the same.

32. A method according to claim 31 further comprising after step (h) and before step (i) the steps of:

(k) applying laser energy simultaneously in substantially equal magnitude at each of a third set of locations equal in number to the number of locations in the first set, each of the locations in the third set being intermediate a pair of locations in the first set, thereby to weld the spool to the wall at the third set of locations such that there occurs minimal misalignment between the lensed end of the fiber and the laser upon cooling of the welds at the third set of locations;

(l) again aligning the lensed end of the fiber with respect to the laser to correct any misalignment occurring therebetween as a result of the laser welding at the third set of locations;

(m) applying laser energy simultaneously in substantially equal magnitude at each of a fourth set of locations equal in number to the number of locations in the second set, each of the locations in the fourth set being intermediate a pair of locations in the second set, thereby to weld the spool to the metallic tube at the fourth set of locations, the laser energy being directed through the reduced dimension portion of the spool such that, upon cooling of the welds at the fourth set of locations, displacement of the tube relative to the spool is substantially eliminated; and (n) again aligning the lensed end of the fiber with respect to the laser to correct any misalignment occurring therebetween as a result of the laser welding at the fourth set of locations.

33. A method according to claim 32 wherein the metallic tube is mounted in a rigid fixture and the frame is mounted in a second fixture movable with respect thereto, and wherein the alignment steps (c), (f), (h), (l) and (n) are accomplished by moving the frame with respect to the fixed end of the tube.

34. A method according to claim 32 wherein the frame is mounted in a rigid fixture and the free end of the metallic tube opposite the lensed end of the fiber is mounted in a second fixture movable with respect to the frame, and wherein the alignment steps (c), (f), (h), (l) and (n) are accomplished by manipulating the free end of the tube.

35. A method according to claim 32 wherein the frame is mounted in a rigid fixture and the free end of the metallic tube opposite the lensed end of the fiber is mounted in a second fixture movable with respect to the same, with the length of the metallic tube between the free end and the spool being greater than the length of the tube between the lensed end of the fiber and the spool, and wherein the alignment steps (c), (f), (h), (l) and (n) are accomplished by manipulating the free end of the tube such that movement of the free end of the tube for a predetermined distance results in movement of the lenses end of the fiber for a distance that is reduced in proportion to the ratio of the lengths.

36. A method according to claim 31 wherein the metallic tube is mounted in a rigid fixture and the frame is mounted in a second fixture movable with respect thereto, and wherein the alignment steps (c), (f) and (h) are accomplished by moving the frame with respect to the fixed end of the tube.

37. A method according to claim 31 wherein the frame is mounted in a rigid fixture and the free end of the metallic tube opposite the lensed end of the fiber is mounted in a second fixture movable with respect to the frame, and wherein the alignment steps (c), (f) and (h) are accomplished by manipulating the free end of the tube.

38. A method according to claim 31 wherein the frame is mounted in a rigid fixture and the free end of the metallic tube opposite the lensed end of the fiber is mounted in a second fixture movable with respect to the frame, with the length of the metallic tube between the free end and the spool being greater than the length of the tube between the lensed end of the fiber and the spool, and wherein the alignment steps (c), (f) and (h) are accomplished by manipulating the free end of the tube such that movement of the free end of the tube for a predetermined distance results in movement of the lensed end of the fiber for a distance that is reduced in proportion to the ratio of the lengths.

39. The product according to the process claim 31.

40. A method of aligning and fixing in optically coupled relationship an optical fiber having an end portion secured in a feedthrough member and an optical component mounted on a component having a wall member provided with an aperture therein, the method comprising the steps of:

(a) introducing a portion of the feedthrough member through the aperture to project toward the component and aligning the end portion of the optical fiber end in optically coupled relationship with the component;

(b) securing first alignment means to the wall member;

(c) securing the first alignment means to the feedthrough member at a first fixing region thereof proximate to the component;

(d) securing second alignment means to the wall member;

(e) securing the second alignment means to the feedthrough member at a second, distal, fixing region thereof remote from the component and the first fixing region;

(f) positioning the projecting portion of the feedthrough member at a position at which occurs optimal optical coupling between the fiber and the component;

(g) moving the projecting portion of the feedthrough member in a predetermined direction and for a predetermined distance from the position of optimal optical coupling to bend the projecting portion of the feedthrough member past its elastic limit;

(h) checking the degree of optical coupling between the fiber and the component; and (i) repeating steps (f) through (h) iteratively until the optical coupling between the fiber and the component falls within a predetermined close range of the optimal optical coupling.

41. A method of aligning and fixing in optically coupled relationship an optical fiber having an end portion secured in a feedthrough member and an optical component mounted on a component mounting having a wall member provided with an aperture therein, the method comprising the steps of:

(a) introducing a portion of the feedthrough member through the aperture to project toward the component and aligning the end portion of the optical fiber end in optically coupled relationship with the component;

(b) securing first alignment means to the wall member;

(c) securing the first alignment means to the feedthrough member at a first fixing region thereof proximate to the component;

(d) securing second alignment means to the wall member;

(e) securing the second alignment means to the feedthrough member at a second, distal fixing region thereof remote from the component and the first fixing region;

(f) using a manipulator moving the feedthrough member from an initial position at which occurs optimal optical coupling between the fiber and the component, the initial position and the optimal optical coupled position defining a vector therebetween;

(g) moving the projecting portion of the feedthrough member along the vector for a predetermined distance to bend the projecting portion of the feedthrough member past its elastic limit;

(h) checking the degree of optical coupling between the fiber and the component; and (i) repeating steps (f) through (h) iteratively until the optical coupling between the fiber and the component falls within a predetermined close range of the optimal optical coupling.

42. The method of claim 41 wherein in the steps (f) and (g) the manipulator grasps the projecting portion of the feedthrough, and in the step (h) the manipulator is partially released such that during the iterative performance of steps (f) and (g) the movement of the projecting portion of the feedthrough is effected by abutting engagement with the manipulator.

43. The method of claim 41 wherein in the steps (f) the manipulator grasps the projecting portion of the feedthrough, and in the step (g) and (h) the manipulator is partially released such that during the iterative performance of steps (f), (g), and (h) the movement of the projecting portion of the feedthrough is effected by abutting engagement with the manipulator.

44. The method of claim 41 wherein the movement of the projecting portion of the feedthrough member along the vector is effected by independent iterative movements of the projecting portion of the member along two orthogonal components of the vector.

45. The method of claim 41 wherein during the steps (f) through (i) the degree of optical coupling between the fiber and the component is being continuously monitored.

46. A manipulator for a fiber optic feedthrough projecting through an aperture comprising:
a platform;
a first finger mounted on the support;
second finger being movable with respect to the platform;
an actuator for moving the second finger with respect to the first finger;
at least one of the fingers having a notch formed therein, the notch being sized to grasp the projecting portion of the feedthrough when the fingers are positioned in proximity thereto; and means for sensing contact between the feedthrough member and the finger; and means for moving the support to displace the projecting end of the feedthrough grasped between the fingers past its elastic limit.

47. The manipulator of claim 46 wherein sensing means includes the finger being connected in an electrical circuit with the feedthrough member.

48. Laser welding apparatus for performing laser welding operations on an optoelectronic package, the optoelectronic package comprising:
a housing having an aperture in a wall thereof,
an optical component mounted within the housing in alignment with the aperture, and
an optical fiber feedthrough tube encasing an optical fiber, the fiber having a tip thereon,
the laser welding apparatus comprising:
a base;
a beam mounted to the base;
a manipulating assembly mounted to the base;
first clamping means for clamping the optical fiber feedthrough tube to the beam or the manipulating assembly, the optical fiber feedthrough tube being clamped in a predetermined position such that the tip of the fiber lies on an an axis of rotation;
second clamping means for clamping the housing to the manipulating assembly; and
means for generating a plurality of laser beams each emanating from a respective angularly spaced location about the axis of rotation, the laser beams being relatively positioned with respect to the fiber feedthrough and to the housing whereby a welding operation may be effected to secure the fiber feedthrough to the housing;
the manipulating assembly comprising:
positioning means for moving the housing relative to the fiber feedthrough in mutually perpendicular directions in a plane perpendicular to the axis of rotation and along the axis of rotation such that the optical component in the housing is disposed in a desired alignment with the optical fiber encased in the fiber feedthrough tube; and
rotating means for moving the housing and the feedthrough tube through a predetermined angle about the axis of rotation and relatively with respect to the laser beams, the predetermined angle being at least equal to the angular spacing of the laser beams.

49. Laser welding apparatus as claimed in claim 48 wherein the laser beams are of equal power and are arranged to produce radially balanced welds to secure the feedthrough to the housing.

50. Laser welding apparatus as claimed in claim 48 wherein the generating means generates three laser beams disposed 120° apart.

51. Laser welding apparatus as claimed in claim 48 wherein the base is aseismically mounted.

52. Laser welding apparatus as claimed in claim 51 wherein the laser beam generating means is mounted to the base.

53. Laser welding apparatus as claimed in claim 48 further comprising means for providing the alignment between the fiber and the optical component automatically.

54. Laser welding apparatus as claimed in claim 48 wherin the optical component is a light receiver device, the apparatus further comprising means for coupling light into the fiber encased in the feedthrough tube thereby to facilitate optical alignment between the fiber and the light receiver device.

55. Laser welding apparatus as claimed in claim 48 wherein the optical component is a device that outputs light, the apparatus further comprising means for detecting the light from the light outputting device coupled into the fiber encased in the feedthrough tube thereby to facilitate optical alignment between the fiber and the light outputting device.

* * * * *